(12) United States Patent
Novotny et al.

(10) Patent No.: US 8,998,253 B2
(45) Date of Patent: Apr. 7, 2015

(54) FOLDING CAB FRAME

(71) Applicant: Polaris Industries Inc., Medina, MN (US)

(72) Inventors: Shane A. Novotny, Woodbury, MN (US); Bradley R. Morisch, Lindstrom, MN (US); Brian J. Gross, Warroad, MN (US); Jed P. Leonard, Minnetonka, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 13/853,025

(22) Filed: Mar. 28, 2013

(65) Prior Publication Data

US 2013/0256050 A1      Oct. 3, 2013

Related U.S. Application Data

(60) Provisional application No. 61/617,844, filed on Mar. 30, 2012.

(51) Int. Cl.
    *B60R 21/13*    (2006.01)
    *B60K 5/00*     (2006.01)
    (Continued)

(52) U.S. Cl.
    CPC . *B60R 21/13* (2013.01); *B60K 5/00* (2013.01); *B60R 2021/134* (2013.01); *B62D 23/005* (2013.01); *B62D 21/12* (2013.01)

(58) Field of Classification Search
    CPC .................. B60R 2021/134; B60R 2021/13; B60J 7/028; B60J 7/14
    USPC ....................................... 280/756; 296/107.17
    See application file for complete search history.

(56) References Cited

U.S. PATENT DOCUMENTS

| 2,672,103 | A |   | 3/1954 | Hohmes |
|-----------|---|---|--------|--------|
| 3,259,211 | A | * | 7/1966 | Ryskamp ...................... 280/756 |
| 3,336,074 | A | * | 8/1967 | Barnes et al. .................. 296/102 |

(Continued)

FOREIGN PATENT DOCUMENTS

| CA | 2265693 | C | * | 1/2004 |
|----|---------|---|---|--------|
| CH | 317335  | A |   | 11/1956 |

(Continued)

OTHER PUBLICATIONS

Brochure, Fully Equipped LTATV Sales, Copyright 2010-2011, available at http://chrishainesoffroad.com/vehicles.pdf, last accessed Jul. 15, 2014, 2 pgs.

(Continued)

*Primary Examiner* — Nicole Verley
(74) *Attorney, Agent, or Firm* — Faegre Baker Daniels LLP

(57) ABSTRACT

An illustrative embodiment of the present disclosure includes a vehicle having a plurality of ground engaging members, a chassis supported by the plurality of ground engaging members, and an engine supported by the chassis. The engine is configured to provide power to at least one of the plurality of ground engaging members. The vehicle further has a seating area supported by the chassis. The seating area includes at least an operator seat and a passenger seat in a side-by-side arrangement. The vehicle further has a plurality of longitudinal members positionable above the seating area, and a coupling device coupled to at least one of the longitudinal members. The coupling device has an adjustment member to vary a force of the coupling device.

5 Claims, 40 Drawing Sheets

(51) Int. Cl.
*B62D 23/00* (2006.01)
*B62D 21/12* (2006.01)

(56) References Cited

U.S. PATENT DOCUMENTS

| | | | |
|---|---|---|---|
| 3,858,902 A | 1/1975 | Howells et al. | |
| 3,917,310 A * | 11/1975 | Mitsuishi | 280/756 |
| 4,027,892 A | 6/1977 | Parks | |
| 4,089,542 A * | 5/1978 | Westerman | 280/639 |
| 4,098,414 A | 7/1978 | Abiera | |
| 4,340,124 A * | 7/1982 | Leonard | 180/208 |
| 4,561,323 A | 12/1984 | Stromberg | |
| 4,626,024 A * | 12/1986 | Swann | 296/216.03 |
| 4,695,089 A * | 9/1987 | Fukutomi et al. | 296/107.09 |
| 4,700,982 A * | 10/1987 | Kuraoka et al. | 296/107.09 |
| 4,821,825 A | 4/1989 | Somerton-Rayner | |
| 4,934,737 A | 6/1990 | Nakatsuka | |
| 5,036,939 A | 8/1991 | Johnson et al. | |
| 5,042,835 A * | 8/1991 | Burns | 280/756 |
| 5,251,713 A | 10/1993 | Enokimoto | |
| 5,393,194 A | 2/1995 | Smith | |
| 5,573,300 A | 11/1996 | Simmons | |
| 5,779,272 A * | 7/1998 | Panek et al. | 280/756 |
| 5,842,732 A * | 12/1998 | Daggett et al. | 296/102 |
| 5,863,277 A | 1/1999 | Melbourne | |
| 5,950,750 A | 9/1999 | Dong et al. | |
| 5,971,434 A * | 10/1999 | Neufeld et al. | 280/756 |
| 6,029,750 A | 2/2000 | Carrier | |
| 6,092,877 A | 7/2000 | Rasidescu et al. | |
| 6,126,227 A * | 10/2000 | Bitelli | 296/107.03 |
| 6,149,540 A | 11/2000 | Johnson et al. | |
| 6,199,894 B1 | 3/2001 | Anderson | |
| 6,293,605 B2 * | 9/2001 | Neubrand | 296/76 |
| 6,416,108 B1 * | 7/2002 | Elswick | 296/96.21 |
| 6,467,787 B1 | 10/2002 | Marsh | |
| 6,557,922 B1 * | 5/2003 | Hommel | 296/107.17 |
| 6,622,968 B1 | 9/2003 | St. Clair et al. | |
| 6,695,566 B2 | 2/2004 | Rodriguez Navio | |
| 6,725,962 B1 | 4/2004 | Fukuda | |
| 6,752,235 B1 | 6/2004 | Bell et al. | |
| 6,786,526 B1 | 9/2004 | Blalock | |
| 6,799,779 B2 | 10/2004 | Shibayama | |
| 6,799,781 B2 | 10/2004 | Rasidescu et al. | |
| 6,916,142 B2 | 7/2005 | Hansen et al. | |
| 6,923,507 B1 | 8/2005 | Billberg et al. | |
| 6,978,857 B2 | 12/2005 | Korenjak | |
| 7,055,454 B1 | 6/2006 | Whiting et al. | |
| 7,124,853 B1 | 10/2006 | Kole, Jr. | |
| 7,125,134 B1 | 10/2006 | Hedlund et al. | |
| 7,165,702 B1 | 1/2007 | Billberg | |
| 7,210,547 B2 * | 5/2007 | Nojima | 180/68.3 |
| 7,222,882 B2 | 5/2007 | Boucher | |
| 7,237,789 B2 | 7/2007 | Herman | |
| 7,239,032 B1 | 7/2007 | Wilson et al. | |
| 7,240,472 B2 * | 7/2007 | Evers | 56/202 |
| 7,240,960 B2 | 7/2007 | Fallis et al. | |
| 7,431,024 B2 | 10/2008 | Buchwitz et al. | |
| 7,500,709 B2 * | 3/2009 | Heselhaus | 296/107.07 |
| 7,559,596 B2 * | 7/2009 | Garska et al. | 296/107.09 |
| 7,568,732 B2 | 8/2009 | Schlup, Jr. | |
| 7,578,523 B2 | 8/2009 | Kosuge et al. | |
| 7,665,792 B1 * | 2/2010 | Flynn | 296/88 |
| 7,677,599 B2 * | 3/2010 | Kurten et al. | 280/756 |
| 7,677,634 B2 * | 3/2010 | Flynn | 296/107.09 |
| 7,871,106 B2 | 1/2011 | Leonard et al. | |
| RE42,086 E * | 2/2011 | Saito et al. | 296/205 |
| 7,896,422 B2 * | 3/2011 | Willard et al. | 296/107.09 |
| 7,922,201 B2 * | 4/2011 | Kurten et al. | 280/756 |
| 7,967,365 B2 * | 6/2011 | Gerhardt et al. | 296/107.03 |
| 7,971,904 B2 * | 7/2011 | David | 280/756 |
| 8,191,952 B2 * | 6/2012 | Mokhtari et al. | 296/3 |
| 8,353,534 B2 * | 1/2013 | Arnold et al. | 280/801.1 |
| 8,544,582 B2 * | 10/2013 | Kaku et al. | 180/68.1 |
| 8,596,709 B2 * | 12/2013 | Ugolini | 296/107.07 |
| 2002/0147072 A1 | 10/2002 | Goodell et al. | |
| 2002/0178968 A1 | 12/2002 | Christensen | |
| 2003/0001409 A1 | 1/2003 | Semple et al. | |
| 2004/0079561 A1 | 4/2004 | Ozawa et al. | |
| 2004/0108159 A1 | 6/2004 | Rondeau et al. | |
| 2004/0195797 A1 | 10/2004 | Nash et al. | |
| 2005/0073140 A1 | 4/2005 | Boucher | |
| 2005/0173177 A1 | 8/2005 | Smith et al. | |
| 2005/0173180 A1 | 8/2005 | Hypes et al. | |
| 2005/0248116 A1 | 11/2005 | Fanson | |
| 2006/0043754 A1 | 3/2006 | Smith | |
| 2007/0290493 A1 | 12/2007 | David | |
| 2008/0023240 A1 | 1/2008 | Sunsdahl et al. | |
| 2008/0023249 A1 | 1/2008 | Sunsdahl et al. | |
| 2010/0060026 A1* | 3/2010 | Bowers | 296/66 |
| 2010/0090430 A1 | 4/2010 | Weston | |

FOREIGN PATENT DOCUMENTS

| | | |
|---|---|---|
| DE | 116605 C | 2/1900 |
| DE | 1755101 A1 | 4/1971 |
| DE | 3033707 A1 | 4/1982 |
| DE | 102010017784 * | 2/2012 |
| EP | 0238077 A2 | 9/1987 |
| EP | 0709247 A2 | 5/1996 |
| EP | 0794096 A2 | 9/1997 |
| EP | 1215107 A1 | 6/2002 |
| EP | 1557345 A2 | 7/2005 |
| EP | 1564123 A2 | 8/2005 |
| JP | H11334447 A | 7/1999 |
| JP | 2000177434 A | 6/2000 |
| JP | 3385382 B2 * | 3/2003 |
| JP | 2007038709 A * | 2/2007 |

OTHER PUBLICATIONS

Webpage, RP Advanced Mobile Systems: Military SxS Light Tactical Defense Vehicles, available at least as early as Mar. 24, 2012, available at https://web.archive.org/web/20120324210549/http://www.rpadvancedmobilesystems.com/, last accessed Jul. 15, 2014, 4 pgs.

International Search Report and Written Opinion for PCT/US2008/003485 issued by the European Patent Office on Aug. 27, 2008, 15 pages.

Written Opinion for PCT/US2008/003480 issued by the European Patent Office on Sep. 1, 2008, 19 pages.

International Search Report and Written Opinion for PCT/US2008/003483 issued by the European Patent Office on Oct. 2, 2008, 18 pages.

Strike Razor: Light Tactical Vehicle, Advanced Mobile Systems, 2 pages, copyright 2011.

* cited by examiner

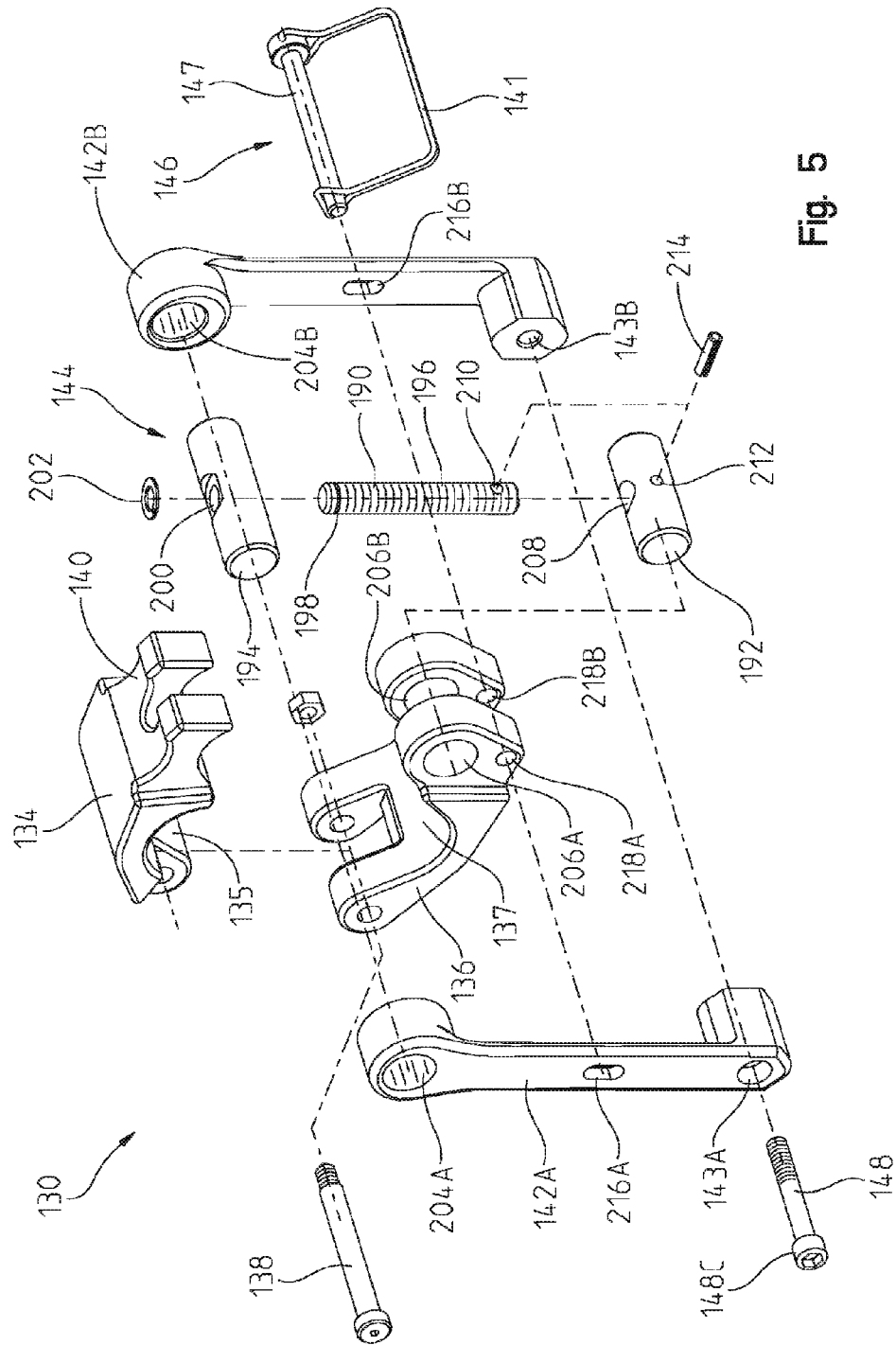

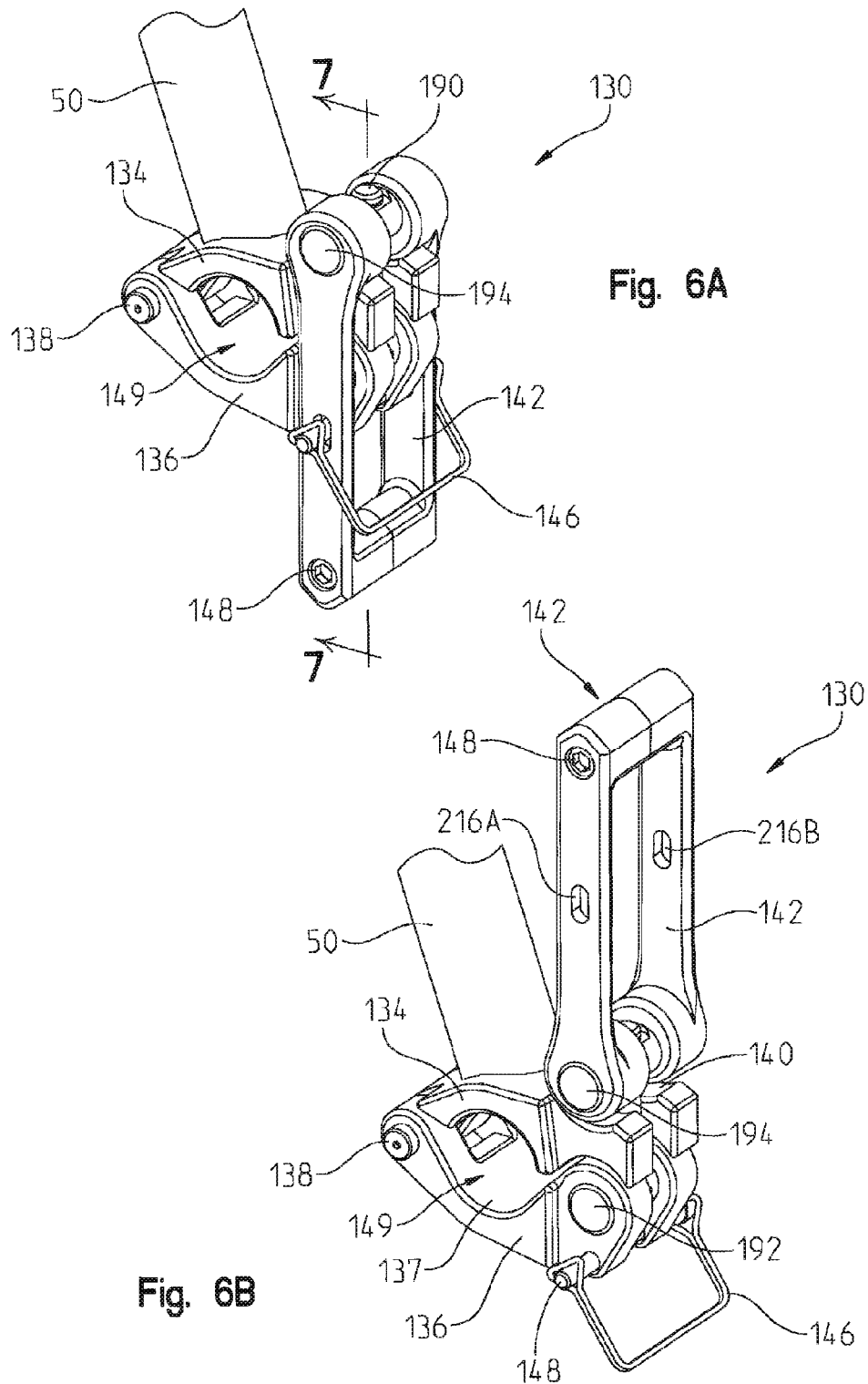

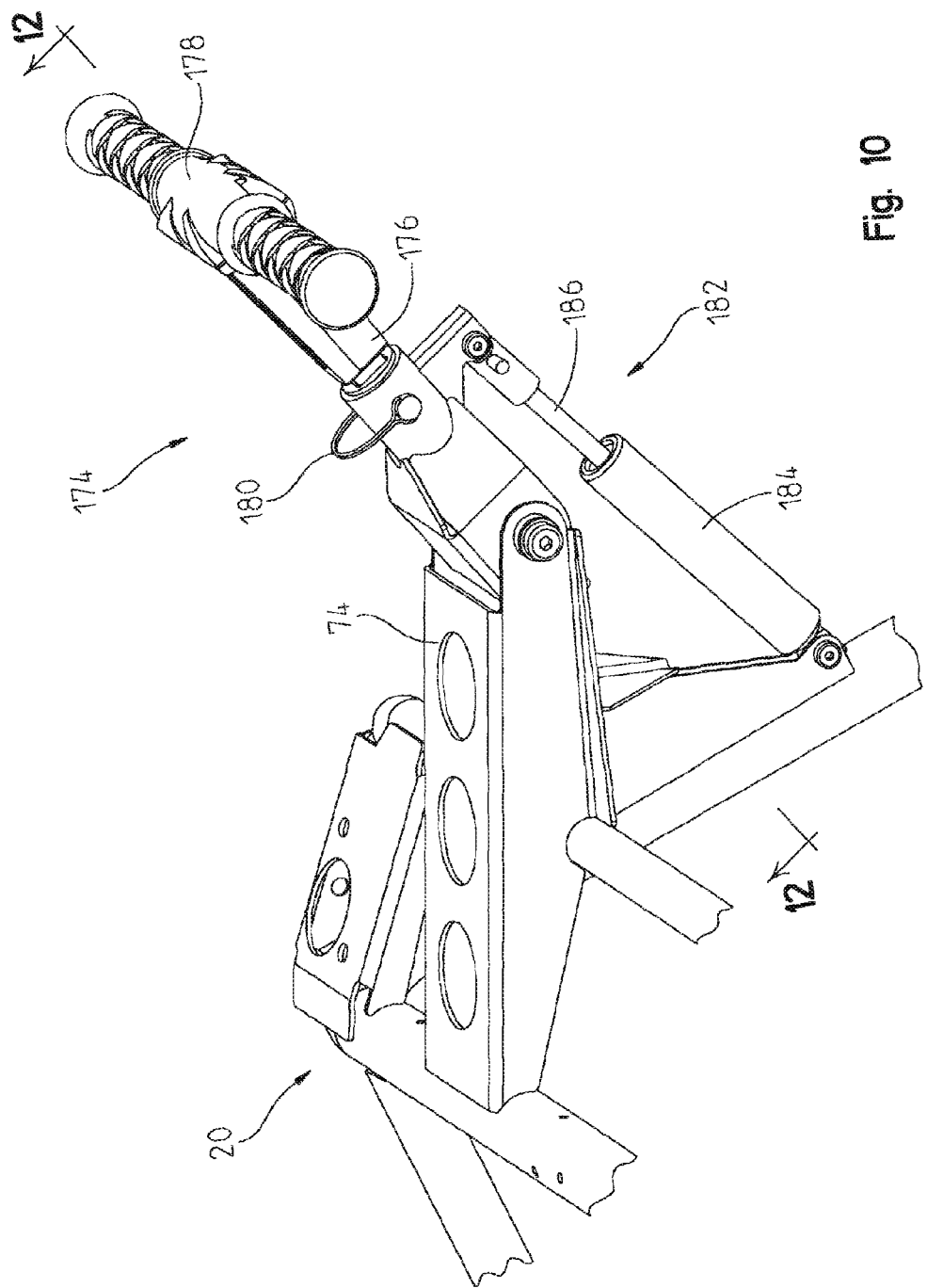

FOLDING CAB FRAME

CROSS-REFERENCE TO RELATED APPLICATIONS

The present application claims the benefit of U.S. Provisional Patent Application Ser. No. 61/617,844, filed on Mar. 30, 2012, the complete disclosure of which is expressly incorporated by reference herein.

BACKGROUND OF THE DISCLOSURE

The present disclosure relates to vehicles, and more particularly to side-by-side utility and all-terrain vehicles.

Generally, all-terrain vehicles ("ATVs") and utility vehicles ("UVs") are used to carry one or more passengers over a variety of terrain. More particularly, some ATVs and UVs may include side-by-side seating, in which a passenger may be seated next to the driver at the front of the vehicle. Side-by-side vehicles also may include a rear seating area to accommodate additional passengers in the vehicle. A roll cage may be provided over the seating of the vehicle. Additionally, ATVs and UVs may provide a cargo area in the front and/or the rear of the vehicle in order to carry cargo.

SUMMARY OF THE DISCLOSURE

An illustrative embodiment of the present disclosure includes a vehicle comprising a plurality of ground engaging members; a chassis supported by the plurality of ground engaging members; and an engine supported by the chassis. The engine is configured to provide power to at least one of the plurality of ground engaging members. The vehicle further comprises a seating area supported by the chassis. The seating area includes at least an operator seat and a passenger seat in a side-by-side arrangement. The vehicle further comprises a plurality of longitudinal members positionable above the seating area; and a coupling device coupled to at least one of the longitudinal members. The coupling device has an adjustment member to vary a force of the coupling device.

Another illustrative embodiment of the present disclosure includes a vehicle comprising a plurality of ground engaging members; a frame supported by the plurality of ground engaging members; a hood supported by the frame; and an engine supported by the frame. The engine is configured to provide power to at least one of the plurality of ground engaging members. The vehicle further includes a seating area supported by the ground engaging members, and a cargo area rearward of the seating area. Additionally, the vehicle comprises a roll cage positionable above the seating area. The roll cage is configured to rotate between a first position and a second position. The first position includes the roll cage positioned above the seating area. The second position includes the roll cage pivoted in a forward direction and supported on the hood. The roll cage is spaced apart from the cargo area when in the second position.

A further illustrative embodiment of the present disclosure includes a vehicle comprising a plurality of ground engaging members; a frame supported by the plurality of ground engaging members; and an engine supported by the frame. The engine is configured to provide power to at least one of the plurality of ground engaging members. The vehicle of the present disclosure further comprises a seating area supported by the ground engaging members. The seating area includes at least an operator seat, a front passenger seat, and at least one rear passenger seat positioned rearward of the operator seat and the front passenger seat. The frame includes a first movable portion positioned above the operator seat and the front passenger seat, and a second movable portion positioned above the at least one rear passenger seat. The second movable portion is coupled to the first movable portion such that the first and second movable portions are configured to move together.

Yet another illustrative embodiment of the present disclosure includes a vehicle comprising a plurality of front ground engaging members; a plurality of rear ground engaging members positioned rearward of the front ground engaging members; and a frame supported by the plurality of ground engaging members. The frame extends in a longitudinal direction of the vehicle and includes a front portion supported by the front ground engaging members, a rear portion supported by the rear ground engaging members, and an intermediate portion rearward of the front portion and forward of the rear portion. The vehicle further comprises an engine supported by the frame and configured to provide power to at least one of the plurality of ground engaging members. Additionally, the vehicle comprises a seating area supported by the ground engaging members and a plurality of longitudinal members positionable above the seating area. The plurality of longitudinal members are configured to move between a raised positioned and a lowered position. The raised position includes the longitudinal members positioned above the seating area, and the lowered position includes the longitudinal members positioned forward of the seating area. Each of the longitudinal members include a pivot device spaced apart from adjacent pivot devices.

Another illustrative embodiment of the present disclosure includes a vehicle comprising a plurality of ground engaging members; a frame supported by the plurality of ground engaging members; and an engine supported by the frame and configured to provide power to at least one of the plurality of ground engaging members. Additionally, the vehicle comprises a seating area supported by the ground engaging members which includes an operator seat and a passenger seat laterally adjacent the operator seat. The vehicle further comprises a grab bar coupled to the frame and forward of the passenger seat. The grab bar is configured to move in a first range of motion and a second range of motion. The first range of motion is movement in a generally forward and rearward direction and the second range of motion is movement in a generally upward and downward direction.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

FIG. 5 is an exploded view of an illustrative coupling device;

FIG. 6A is a rear perspective view of the coupling device of FIG. 5 in a closed position;

FIG. 6B is a further rear perspective view of the coupling device including a handle rotated upwardly;

FIG. 10 is a side perspective view of a grab handle of the present disclosure;

Figure 1:
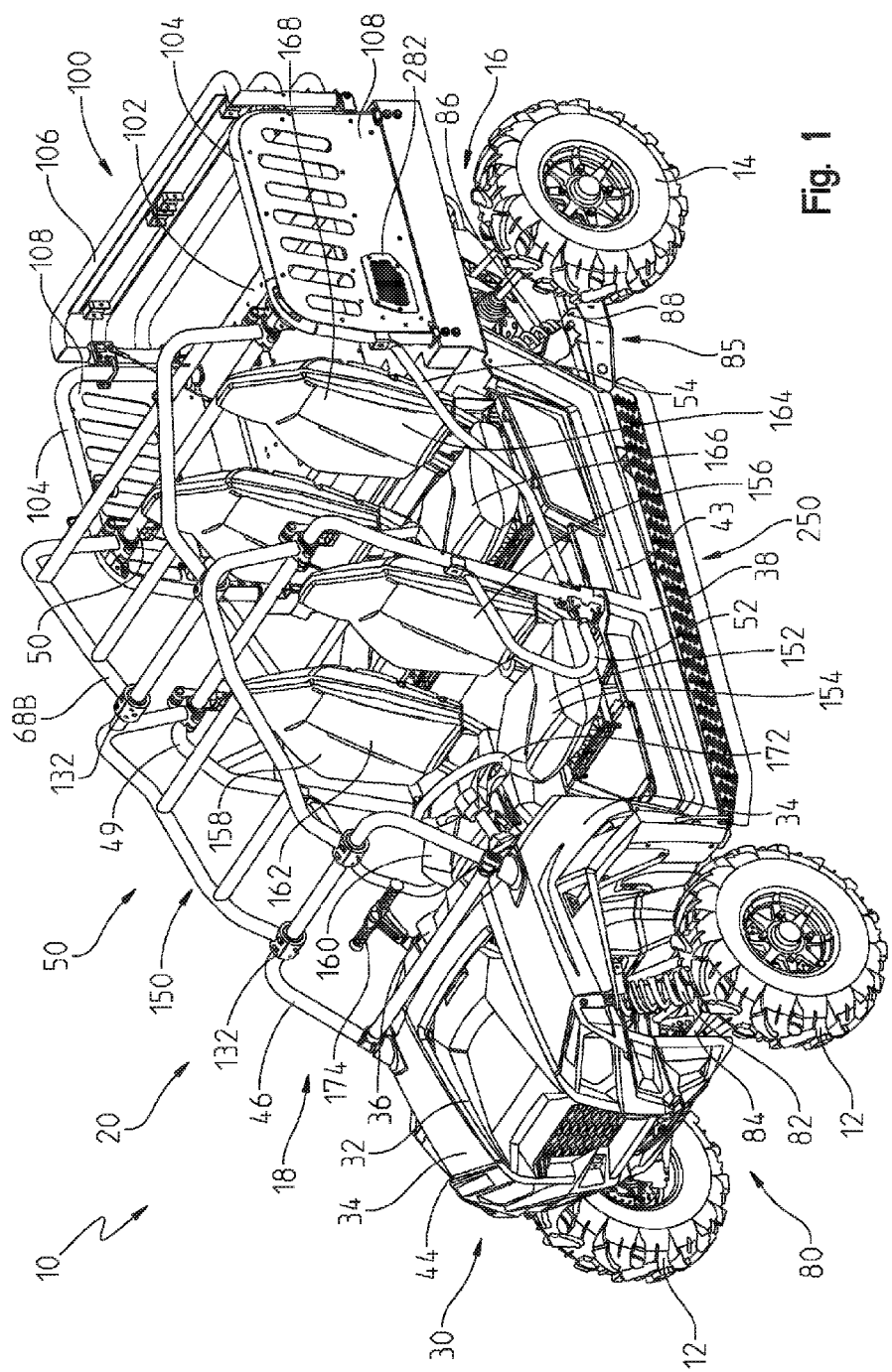
FIG. 1 is a front perspective view of an illustrative vehicle of the present disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, and golf carts.

Figure 2:
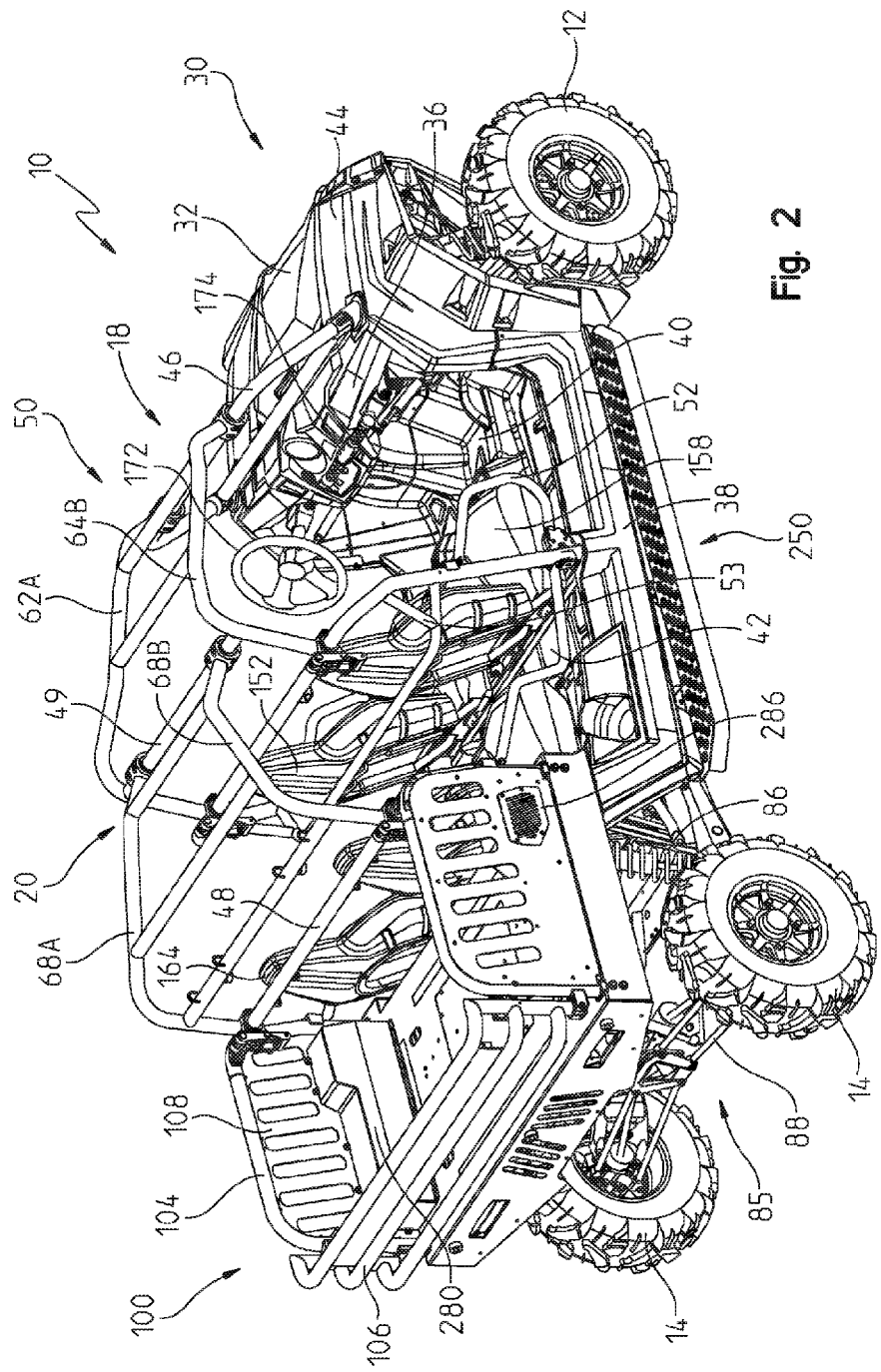
FIG. 2 is a rear perspective view of the vehicle of FIG. 1.
Figure 3:
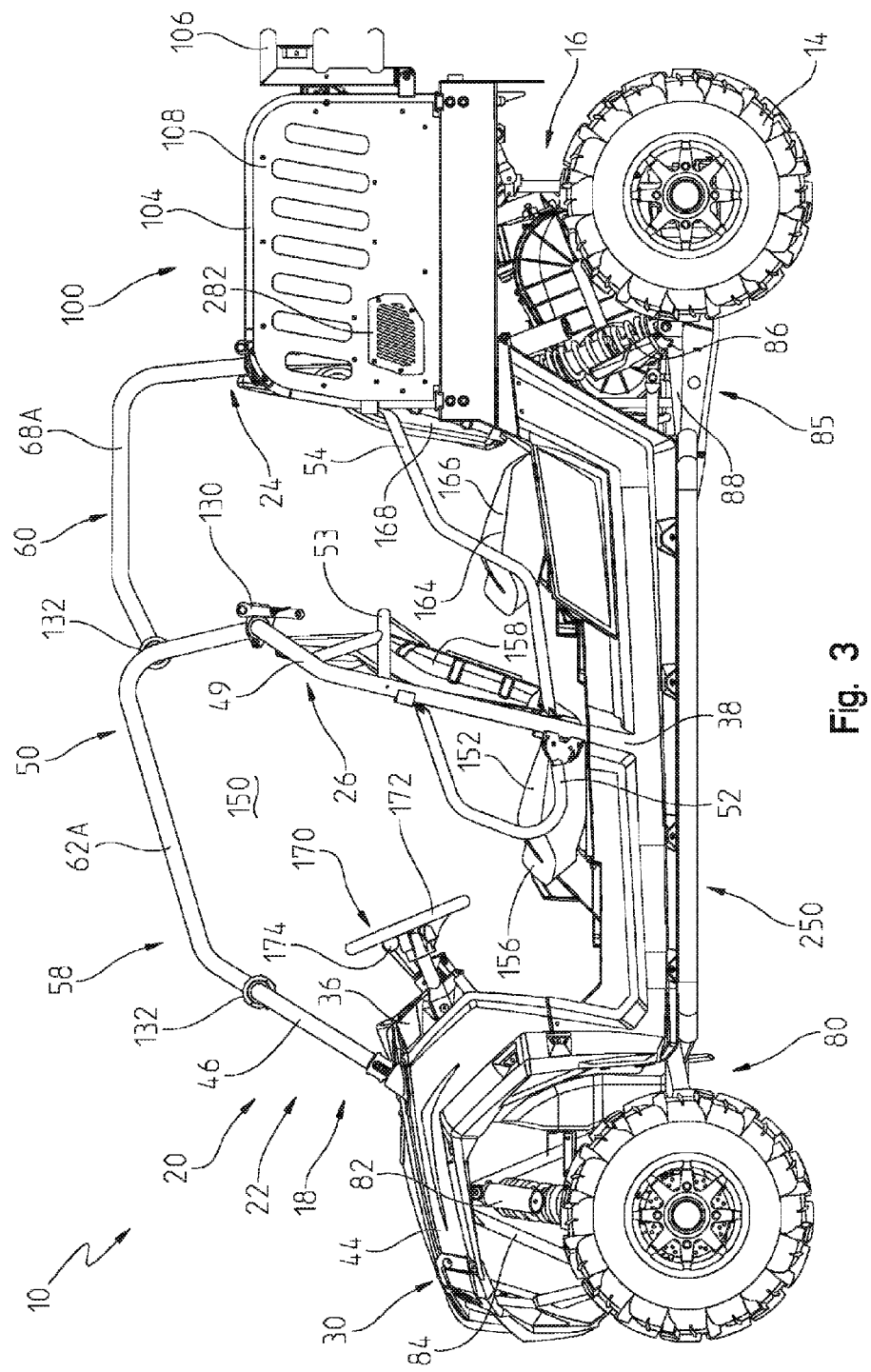
FIG. 3 is a side elevational view of the vehicle of FIG. 1.

Referring to FIGS. 1-3, an illustrative embodiment of a vehicle 10 is shown, and includes ground engaging members, a drivetrain assembly 16, a frame 20, a body or chassis 30, a front suspension assembly 80, a rear suspension assembly 85, and a cargo area 100. Vehicle 10 may be referred to as a utility vehicle ("UV"), an all-terrain vehicle ("ATV"), or a side-by-side vehicle ("S×S") and is configured for travel over various terrains or surfaces. More particularly, vehicle 10 may be configured for military applications.

Vehicle 10 includes a plurality of ground engaging members, illustratively a set of front wheels 12 and a set of rear wheels 14. In one embodiment, one or more wheels 12, 14 may be replaced with tracks, such as the PROSPECTOR II tracks available from Polaris Industries, Inc. located at 2100 Highway 55 in Medina, Minn. 55340.

Figure 21:
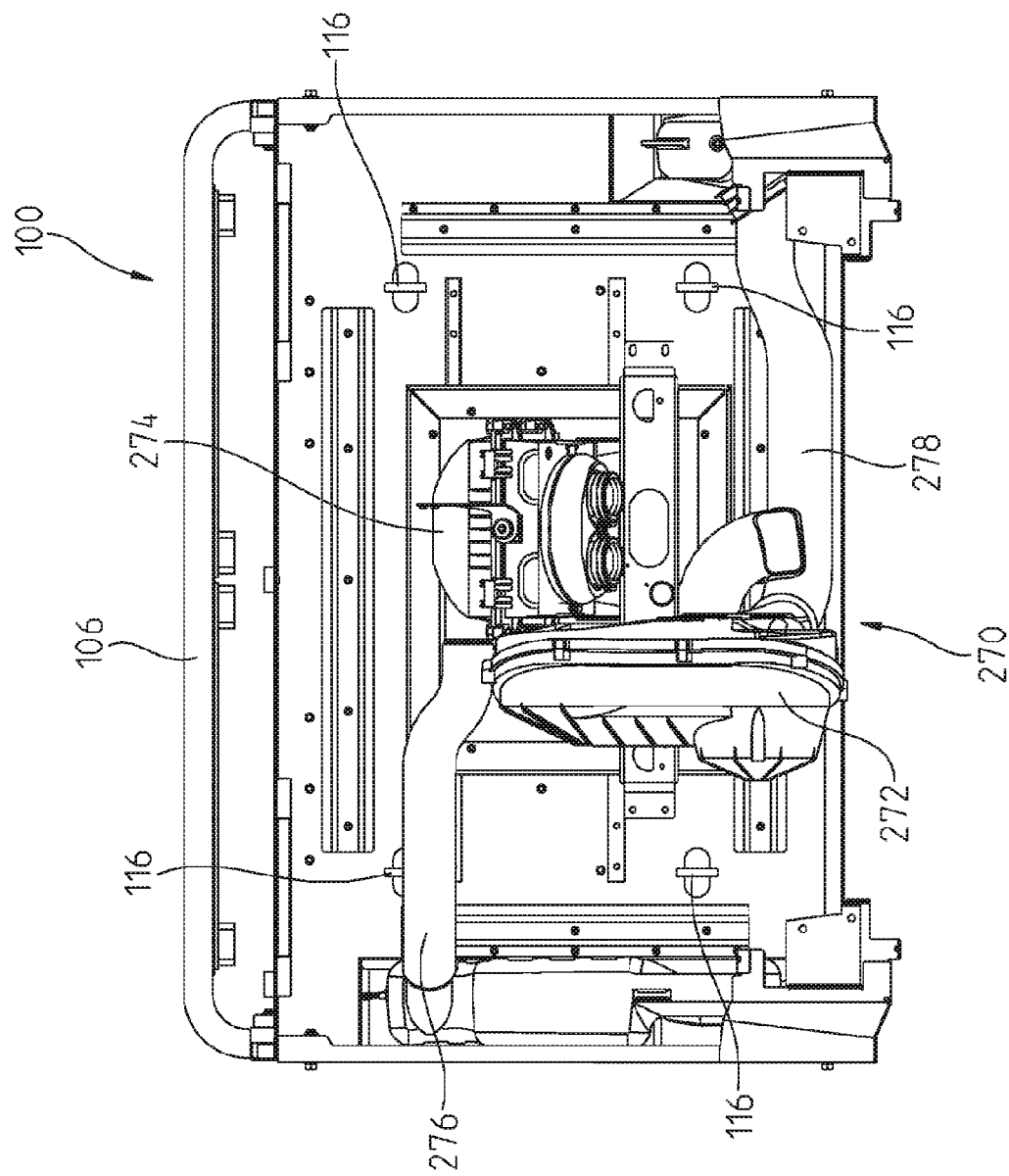
FIG. 21 is a bottom elevational view of the cargo area, including an engine assembly, a continuously variable transmission assembly, and an air intake system of the present disclosure.

Drivetrain assembly 16 is operably supported on frame 20 and is drivingly connected to one or more of wheels 12, 14. As shown in FIG. 21, drivetrain assembly 16 may include an engine 274, a transmission, for example a continuously variable transmission ("CVT") 272, front and rear differentials (not shown), and a drive shaft (not shown). Engine 274 may be a fuel-burning internal combustion engine, however, any engine assembly may be contemplated, such as hybrid, fuel cell, or electric.

Front suspension assembly 80 may be coupled to chassis 30 and front wheels 12. As shown in FIGS. 1 and 3, front suspension assembly 80 includes a shock 82 coupled to each front wheel 12 and a front axle arrangement which may include a front control arm assembly 84. Similarly, rear suspension assembly 85 may be coupled to chassis 30 and rear wheels 14. Illustratively, rear suspension assembly 85 includes a shock 86 coupled to each rear wheel 14 and a rear axle arrangement 88. Additional details of drivetrain assembly 16 and front suspension assembly 80 may be described in U.S. Pat. No. 7,819,220, filed Jul. 28, 2006, titled "SIDE-BY-SIDE ATV", Docket No. PLR-06-1688.01P, and U.S. Patent Application Publication No. 2008/0023240, filed Jul. 28, 2006, titled "SIDE-BY-SIDE ATV," Docket No. PLR-06-1688.02P; and additional details of rear suspension assembly 85 are described in U.S. Patent Application Publication No. 2012/0031693, filed Aug. 3, 2010, titled "SIDE-BY-SIDE ATV," Docket No. PLR-06-24357.02P, the disclosures of which are expressly incorporated by reference herein.

Chassis 30 may include a hood 32, front fenders 34, a dashboard assembly 36, side boards 38, a front floorboard 40, a rear floorboard 42, foot plates 43, and cargo area 100.

Additional accessories, such as a bumper or front brush guard 44, may be included on chassis 30. Chassis 30 may conceal certain components of vehicle 10, for example hood 32 and front fenders 34 may conceal a front differential and other portions of front suspension assembly 80. Additionally, portions of chassis 30, such as hood 32 and cargo area 100, may include attachment members (e.g., hooks and latches) for securing accessories to vehicle 10, as is further detailed herein. Chassis 30 illustratively extends in a longitudinal direction of vehicle 10.

Referring to FIGS. 1-3, vehicle 10 includes a seating area 150 supported by chassis 30 and frame 20, and which includes seating for at least an operator and a passenger. Illustratively, one embodiment of vehicle 10 includes four seats, including an operator seat 152, a front passenger seat 158, and two rear passenger seats 164. More particularly, operator seat 152 and front passenger seat 158 are in a side-by-side arrangement, and rear passengers seats 164 also are in a side-by-side arrangement. Rear passenger seats 164 are positioned behind operator seat 152 and front passenger seat 158 and may be elevated relative to seats 152, 158. Operator seat 152 includes a seat bottom 154, illustratively a bucket seat, and a seat back 156. Similarly, front passenger seat 158 includes a seat bottom 160, illustratively a bucket seat, and a seat back 162. Likewise, each rear passenger seat 164 includes a seat bottom 166, illustratively a bucket seat, and a seat back 168.

Vehicle 10 further includes frame 20 supported by wheels 12, 14. In particular, frame 20 includes a front frame portion 22, a rear frame portion 24, and an intermediate frame portion 26. Vehicle 10 also comprises an overhead frame portion, illustratively, a roll cage 50. Roll cage 50 is coupled to frame 20 and cooperates with seating area 150 to define a cab 18 of vehicle 10, as is further detailed herein.

Figure 4:
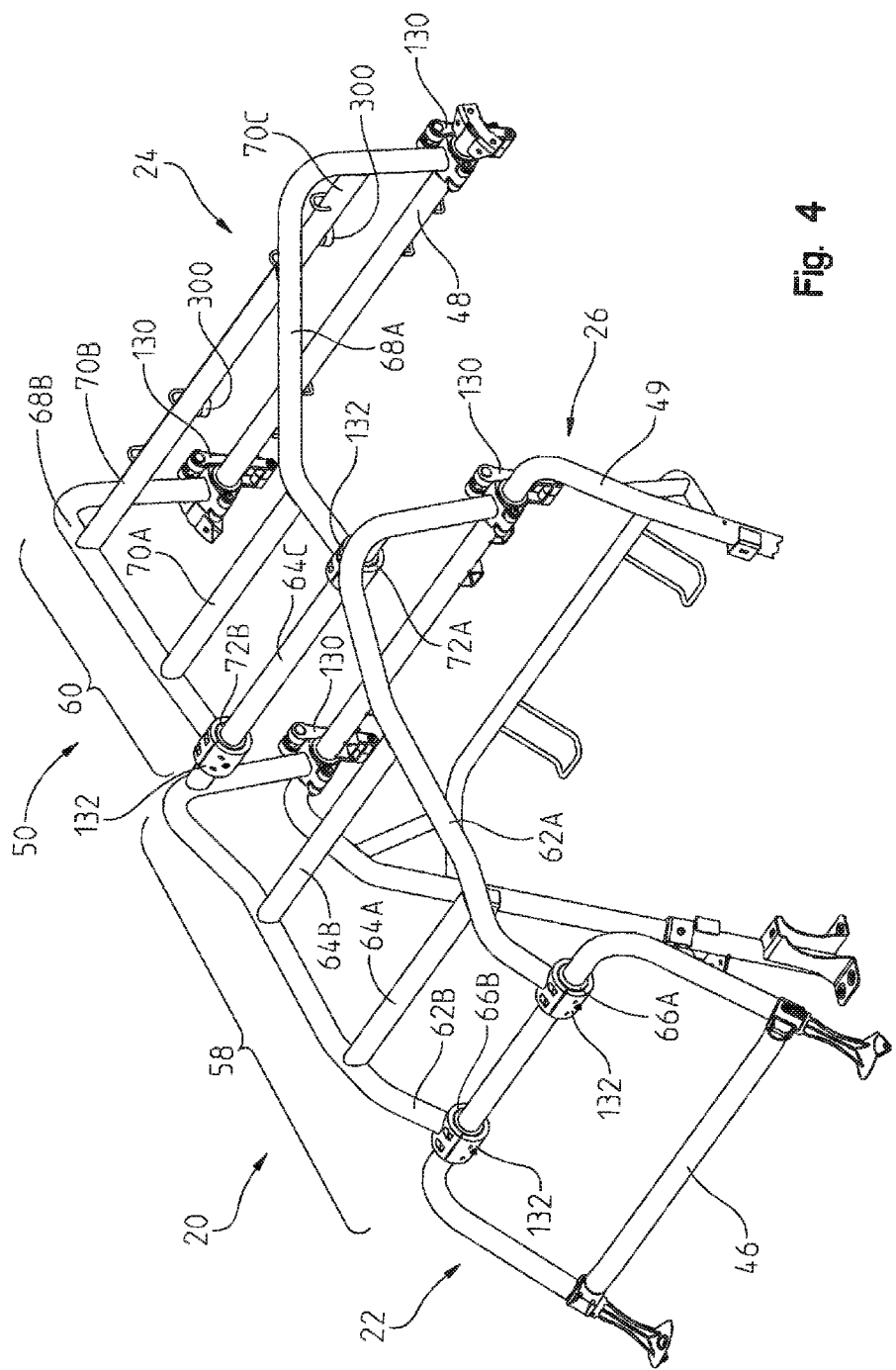
FIG. 4 is a front perspective view of an illustrative roll cage and frame of the vehicle of the present disclosure.
Figure 13:
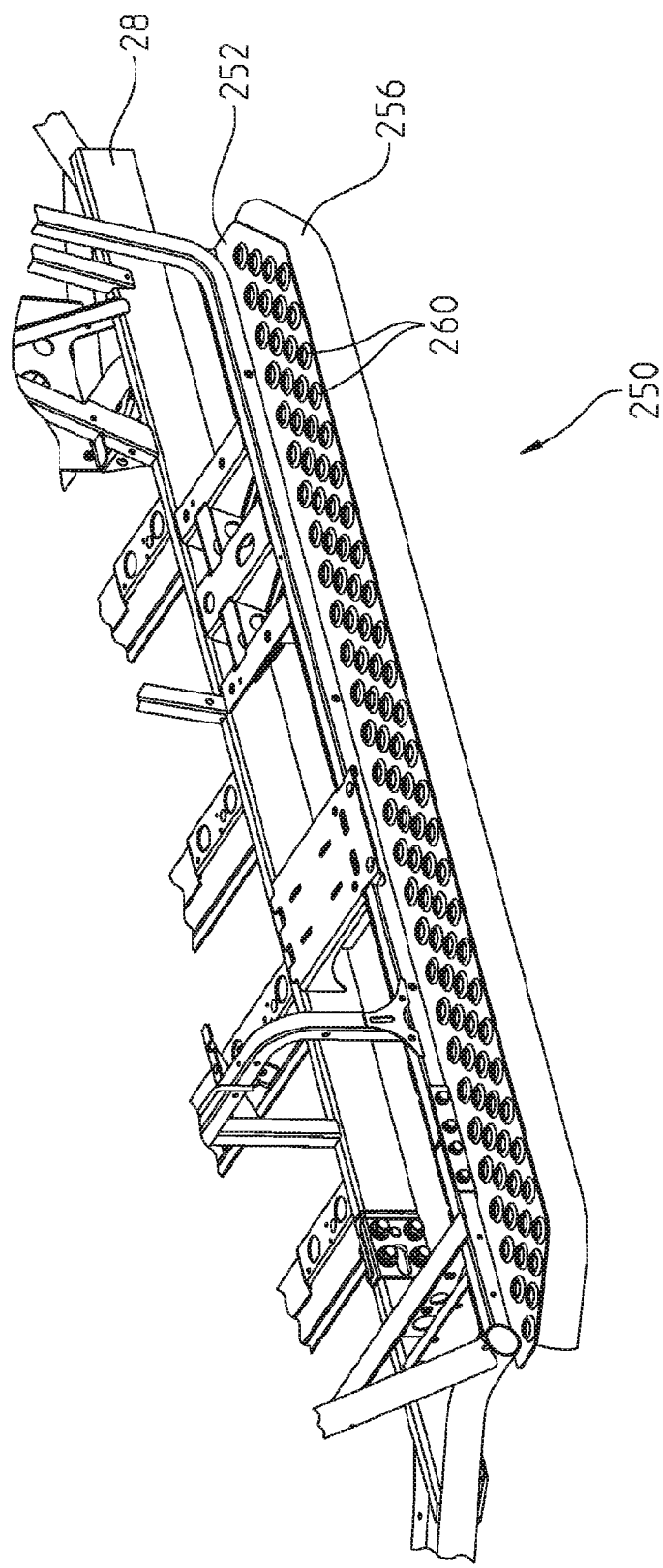
FIG. 13 is a side perspective view of a running board assembly of the present disclosure.
Figure 14:
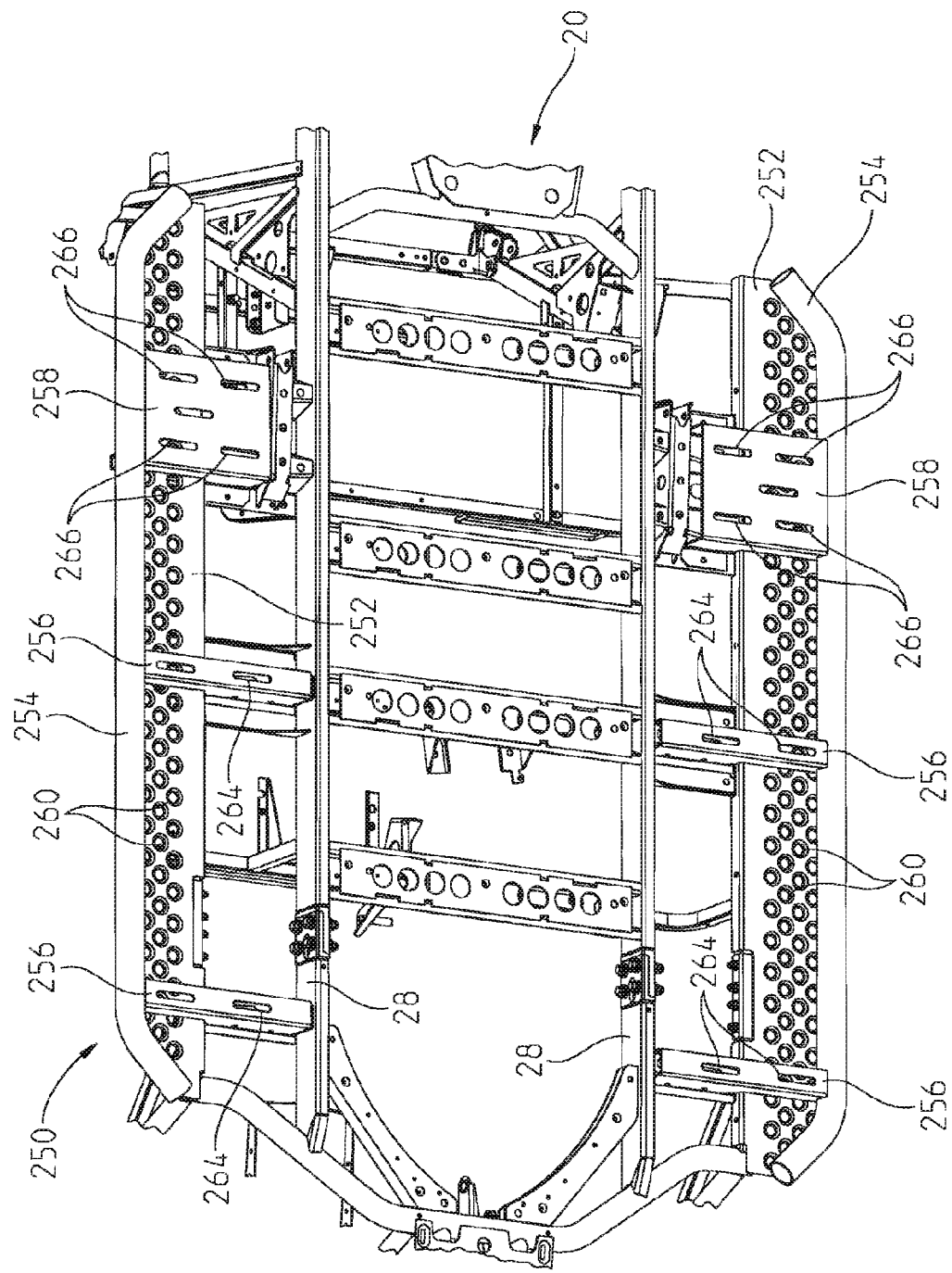
FIG. 14 is a bottom perspective view of the running board assembly of FIG. 13.
Figure 15:
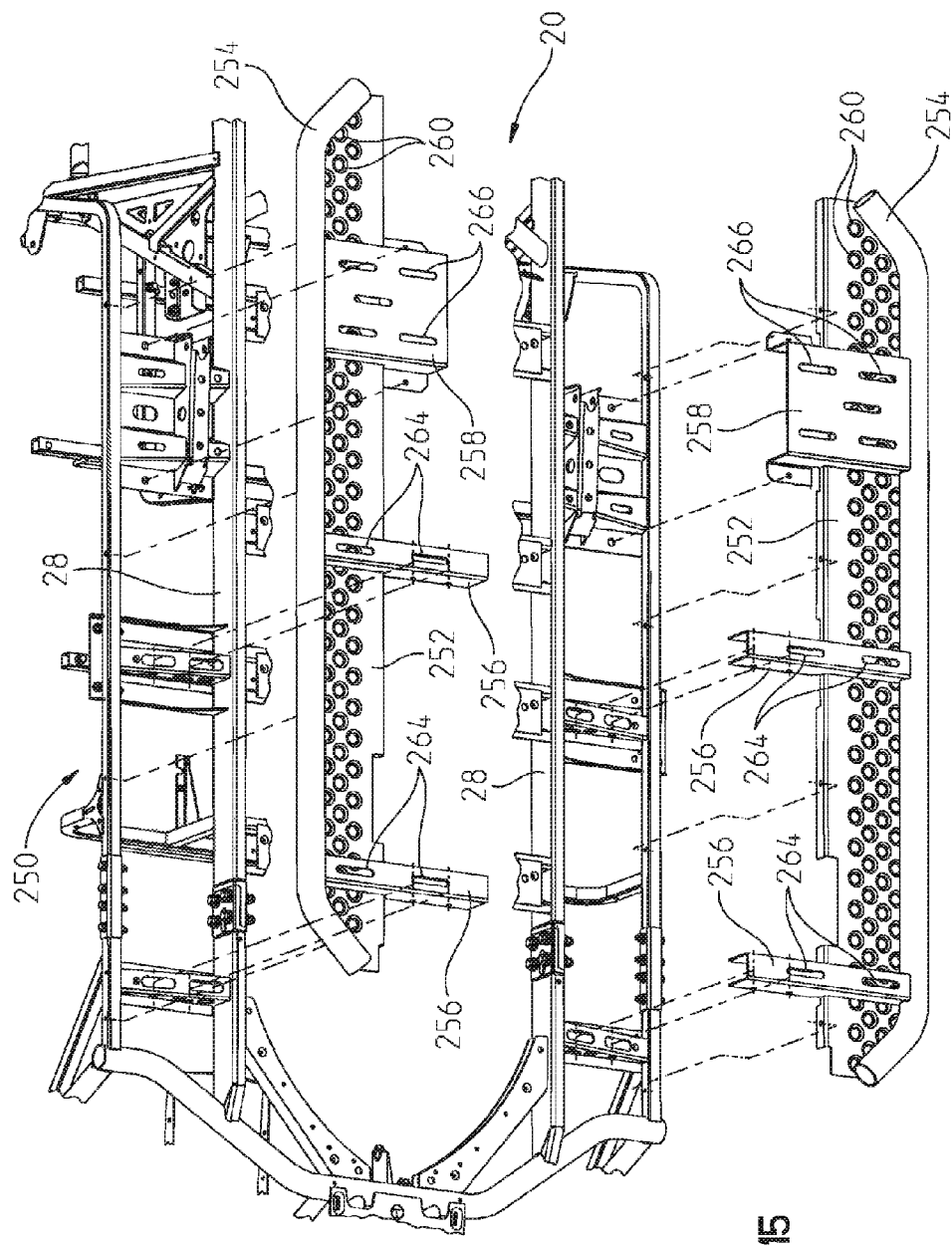
FIG. 15 is an exploded view of the running board assembly.

Referring to FIG. 3, front frame portion 22 illustratively includes a front frame member 46 positioned forward of seating area 150. Front frame member 46 may be coupled to chassis 30 and/or to other components of frame 20, for example frame rails 28 (FIGS. 13-15). As shown in FIG. 4, illustrative front frame member 46 is a four-bar member having a substantially rectangular shape; however, other configurations of front frame member 46 are possible, for example front frame member 46 may be generally U-shaped. Front frame member 46 may support a windshield (not shown). Illustrative front frame member 46 is comprised of multiple frame components coupled together through conventional fastening means (e.g., welds, bolts, screws, rivets, or adhesive), as further detailed herein.

As shown in FIGS. 1-4, rear frame portion 24 illustratively includes a rear frame member 48. Rear frame member 48 may be removably coupled to cargo area 100, as is detailed herein. Rear frame member 48 is rearward of seating area 150 and, more particularly, is rearward of rear passenger seats 164. Exemplary rear frame member 48 extends generally horizontally and may be substantially perpendicular to the longitudinal direction of vehicle 10. Alternative embodiments of rear frame portion 24 may include additional frame members.

Referring to FIGS. 1-4, intermediate frame portion 26 illustratively includes an intermediate frame member 49 spaced apart from front frame member 46 and rear frame member 48. Intermediate frame member 49 illustratively extends above and is laterally outward from operator seat 152 and front passenger seat 158. Intermediate frame member 49 may be coupled to frame 20 and/or chassis 30, and in particular side boards 38, with conventional fasteners, such as bolts, welds, rivets, or adhesive. As is further detailed herein, intermediate frame member 49 may be comprised of multiple frame components coupled together.

Additionally, intermediate frame portion 26 may support bolster members 52, 54, 56. As shown in FIGS. 1-3, illustrative bolster members 52 are forward of bolster members 53, 54. More particularly, bolster members 52 assist in retaining the operator and a front passenger in seats 152, 158, respectively. Additionally, bolster members 54 assist in retaining rear passengers in seats 164. Rear passengers also may use bolster member 53 for additional support. Bolster member 53 is rearward of seats 152, 158, and forward of seats 164, and is coupled to opposing sides of intermediate frame member 49. Illustratively, bolster member 53 is a grab bar for rear passengers.

Referring to FIGS. 3 and 4, roll cage 50 includes a forward section 58 and a rearward section 60. Roll cage 50 is positioned above seating area 150 and, therefore, above the operator and passengers. Forward section 58 illustratively includes a plurality of longitudinal frame members 62 and cross members 64. More particularly, cross members 64 may be substantially perpendicular to longitudinal frame members 62 and conventionally coupled thereto, for example, through welding, bolts, rivets, and/or adhesive. Illustratively, forward section 58 of roll cage 50 includes two longitudinal frame members 62A, 62B and three cross members 64A, 64B, 64C, however, forward section 58 may not be limited to this arrangement. One end of longitudinal frame members 62A, 62B may be coupled to front frame member 46 at pivot points 66A, 66B, respectively. Additionally, an opposing end of longitudinal frame members 62A, 62B may be removably coupled to intermediate frame member 49 with coupling devices 130, as is further detailed herein.

Referring to FIG. 4, rearward section 60 includes a plurality of longitudinal frame members 68 and cross members 70. Exemplary cross members 70 are substantially perpendicular to longitudinal frame members 68 and may be conventionally coupled thereto with fasteners, such as welds, rivets, bolts, and/or adhesive. Illustratively, rearward section 60 of roll cage 50 includes two longitudinal frame members 68A, 68B and three cross members 70A, 70B, 70C, however, rearward section 60 may not be limited to this arrangement. One end of longitudinal frame members 68A, 68B may be coupled to cross member 64C of forward section 58 at pivot points 72A, 72B, respectively. Additionally, an opposing end of longitudinal frame members 68A, 68B may be removably coupled to rear frame member 48 with coupling devices 130, as is further detailed herein.

Roll cage 50 further includes a plurality of coupling devices 130 and a plurality of pivot devices 132. In particular, one end of each longitudinal frame member 62A, 62B, 68A, 68B includes one coupling device 130 and the opposing end includes one pivot device 132. Referring to FIGS. 5-7, illustrative coupling devices 130 are tooless, quick-release clamps that may be operated by hand. Coupling devices 130 include an upper clamp portion 134, a lower clamp portion 136, a fastener 138, a cam surface 140, a handle 142, an adjustment mechanism 144, a locking pin 146, and a fastener 148. Upper clamp portion 134 and lower clamp portion 136 each include a semi-circular recess 135 and 137, respectively. When coupling device 130 is in a closed position (i.e., upper and lower clamp portions 134, 136 are brought together), recesses 135, 137 define an aperture 149 (FIG. 6A) to receive intermediate frame member 49 and/or rear frame member 48, as shown in FIG. 4.

Referring to FIGS. 5-7, upper and lower clamp portions 134, 136 are pivotably coupled together with fastener 138, illustratively a shoulder bolt. Upper clamp portion 134 is fixedly coupled to roll cage 50, in particular to one end of each longitudinal frame member 62A, 62B, 68A, 68B with welds, bolts, adhesive, rivets, or other fasteners (FIG. 4). Conversely, lower clamp portion 136 is configured to pivot or rotate in clockwise and counterclockwise directions relative to upper clamp portion 134. As such, lower clamp portion 136 is freely pivotable about fastener 138 between an open position and a closed position.

Cam surface 140 extends from upper clamp portion 134. Handle 142 may rotate relative to cam surface 140 in order to close and open coupling device 130. In particular, handle 142 rotates in an over-cam manner (i.e., above cam surface 140) in order to adjust the clamp force, as is further detailed herein. Handle 142 illustratively includes a first side 142A and a second side 142B coupled together with a fastener 148. Fastener 148 is received within apertures 143A, 143B of first and second sides 142A, 142B, respectively. More particularly, as shown in FIG. 7, fastener 148 may be a socket end cap screw that is threaded at one end 148*b* and unthreaded (e.g., smooth) at the other end 148*a*. As such, aperture 143A may be unthreaded such that fastener 148 slides through without any obstruction or engagement. However, aperture 143B may be threaded in order to engage threaded end 148*b* of fastener 148, thereby coupling together first and second sides 142A, 142B of handle 142. An end cap 148*c* of fastener 148 engages a shoulder or step 145 of first side 142A in order to prevent overtightening fastener 148 in handle 142.

As shown in FIG. 5, adjustment mechanism 144 includes an adjustment pin 190, a support pin 192, and a threaded pin 194. In particular, adjustment pin 190 is coupled to handle 142 and lower clamp portion 136. Adjustment pin 190 includes external threads 196 and a groove 198. Adjustment pin 190 is received within an internally threaded aperture 200 of threaded pin 194. A retaining member 202, for example an E-clip, a C-clip, or a spiral external retaining ring, is received within groove 198 of adjustment pin 190 to retain adjustment pin 190 within threaded pin 194. Threaded pin 194 is received within apertures 204A, 204B of first and second sides 142A, 142B, respectively, of handle 142. Illustratively, threaded pin 194 is frictionally held in apertures 204A, 204B of first and second sides 142A, 142B, respectively.

Adjustment pin 190 also is coupled to support pin 192. More particularly, adjustment pin 190 may be received within aperture 208 of support pin 192. Adjustment pin 190 is positioned within support pin 192 so as to align an aperture 210 of adjustment pin 190 and an aperture 212 of support pin 192. As shown in FIG. 5, apertures 210, 212 receive a roll or spring pin 214 to secure adjustment pin 190 within support pin 192.

Referring to FIG. 5, support pin 192 is received within apertures 206A, 206B of lower clamp portion 136. As with threaded pin 194, support pin 192 is frictionally held within apertures 206A, 206B of lower clamp portion 136.

Handle 142 further includes apertures 216A, 216B in first and second sides 142A, 142B, respectively, to receive locking pin 146. Similarly, lower clamp portion 136 includes apertures 218A, 218B, which also receive locking pin 146. In particular, aperture 216A aligns with aperture 218A, and aperture 216B aligns with aperture 218B to receive pin portion 147 of locking pin 146. A retaining portion 141 of locking pin 146 extends between opposing sides of pin portion 147 in order to secure pin portion 147 to lower clamp portion 136 and handles 142.

The clamp force of adjustment mechanism 144 may be increased or decreased without using tools in order to accommodate varying sizes of rear and intermediate frame members 48, 49. In particular, handle 142 may be rotated about adjustment pin 190 in order to adjust the position of handle 142 relative to cam surfaces 140. For example, rotating handles 142 in a counterclockwise direction (as viewed in one of FIGS. 6A-6D) about adjustment pin 190 may increase the distance between handles 142 and cam surfaces 140, thereby allowing frame members with a larger diameter to be received within aperture 149. Furthermore, the clamping force is adjusted accordingly. Additionally, clockwise rotation of handles 142 about adjustment pin 190 may decrease the distance between cam surfaces 140 and handles 142 such that aperture 149 may accommodate frame members with smaller diameters and the appropriate amount of clamping force may be applied thereto. Furthermore, the adjustability of coupling devices 130 is able to reduce vibrations and noise from rattling because the clamping force may be increased such that coupling devices 130 fits securely, rather than loosely, around intermediate frame member 49 and rear frame member 48.

Figure 8A:
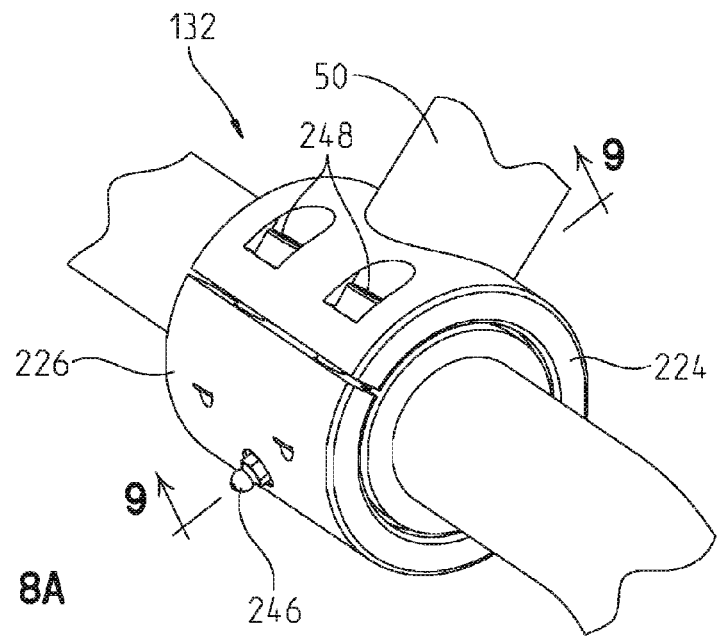
FIG. 8A is a front perspective view of a pivot device of the present disclosure.
Figure 9:
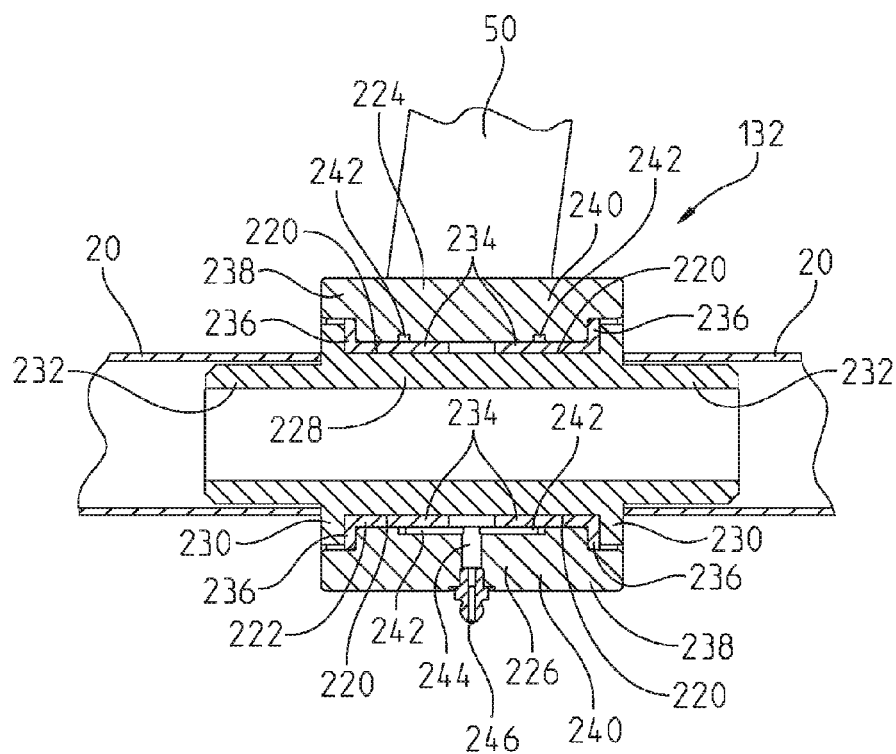
FIG. 9 is a cross-sectional view of the pivot device, taken along line 9-9 of FIG. 8A.
Figure 8B:
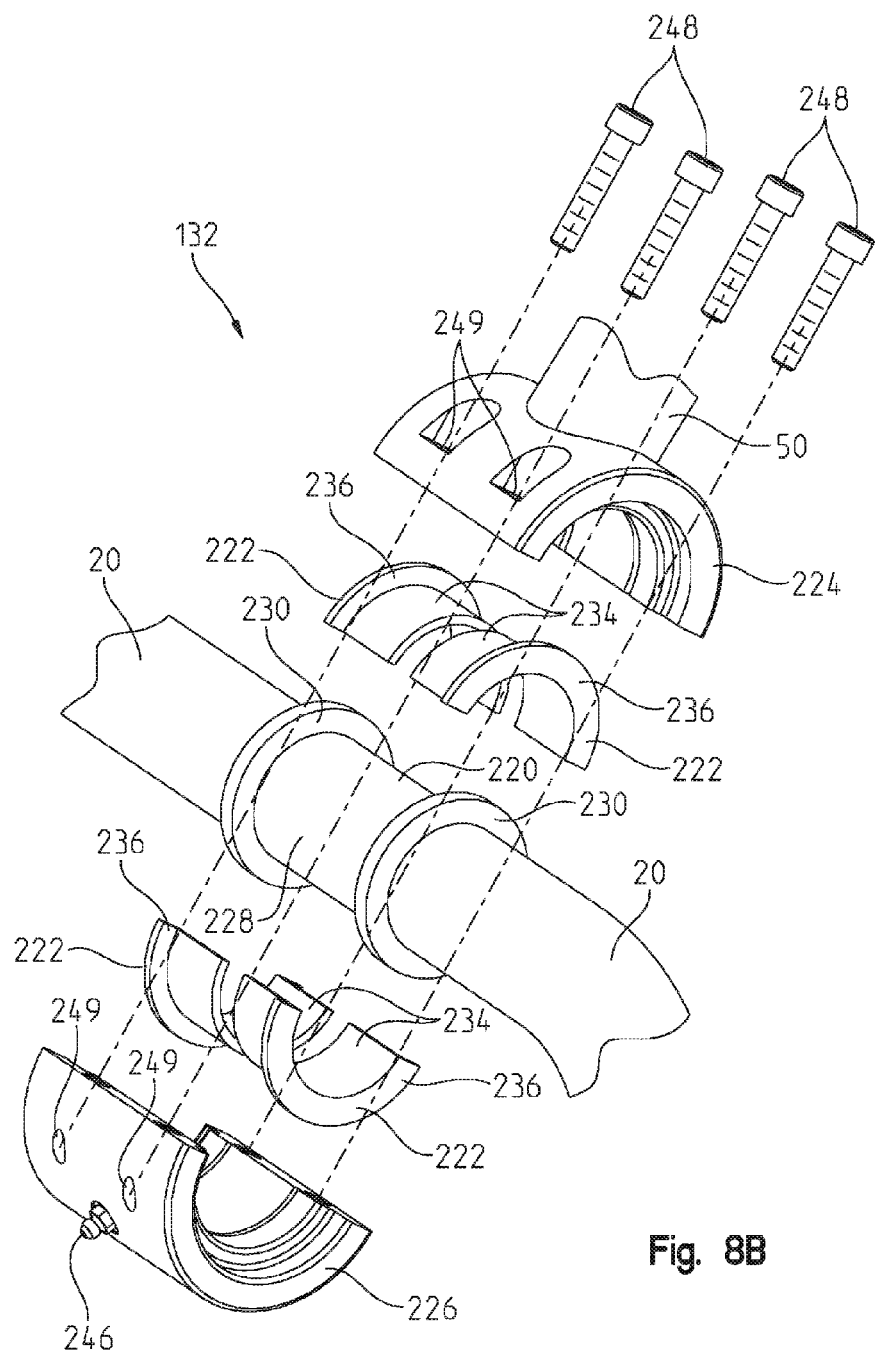
FIG. 8B is an exploded view of the pivot device of FIG. 8A.

As detailed above, roll cage 50 further includes pivot device 132. Referring to FIG. 4, each longitudinal frame member 62A, 62B, 68A, 68B includes a pivot device 132. As shown in FIGS. 8A, 8B, and 9, pivot devices 132 include a frame connector 220, at least one bushing 222, an upper pivot member 224, and a lower pivot member 226. Pivot devices 132 are coupled to front frame member 46 and cross member 64C of forward section 58 to allow forward and rearward sections 58, 60 of roll cage 50 to pivot forward in order to collapse or fold, as is further detailed herein.

Frame connector 220 is positioned between two components of front frame member 46 and cross member 64C. Frame connectors 220 include a body 228, flanges 230, and ends 232. Body 228 and ends 232 may have the same diameter, however, the diameter of body 228 and ends 232 is illustratively less than the diameter of the components of front frame member 46 and cross member 64C. As such, ends 232 may be received within the components of front frame member 46 and cross member 64C until flanges 230 are engaged by the frame components. Frame connectors 220 may be comprised of the same material as the components of front frame member 46 and cross member 64C (e.g., steel) and may be conventionally coupled thereto (e.g., with welds, adhesive, rivets, bolts). In this way, frame connectors 220 form part of front frame member 46 and cross member 64C.

Bushings 222 may be received on body 228 of frame connectors 220, as shown in FIGS. 8A, 8B, and 9. Illustratively, there are four bushings 222, however, various embodiments may include other arrangements of bushings 222. Bushings 222 may be comprised of a polymeric material, rather than a metallic material, in order to prevent corrosion of front frame member 46, cross member 64C, and upper and lower pivot members 224, 226. Bushings 222 include a body 234 and a flange 236. Flanges 236 are positioned adjacent to flanges 230 of frame connectors 220 and body 234 engages body 228 of frame connectors 220. Bushings 222 may be spaced apart from each other, as shown in FIGS. 8A, 8B, and 9.

Referring to FIGS. 8A, 8B, and 9, upper and lower pivot members 224, 226 generally surround bushings 222 and frame connectors 220. Upper and lower pivot members 224, 226 include ends 238, a center portion 240, channels 242, and fasteners 248. Additionally, lower pivot member 226 also may include an aperture 244 and a lubrication dispenser 246, illustratively a grease zerk fitting. Illustrative upper pivot member 224 is fixed to one end of each longitudinal frame member 62A, 62B, 68A, 68B, however, lower pivot member 224 is provided separately and is coupled to upper pivot member 224 with fasteners 248. Illustratively, four fasteners 248 (e.g., socket end cap screws) may be received in apertures 249 in order to couple together upper and lower pivot members 224, 226.

As shown in FIGS. 8A and 9, lubrication dispenser 246 may be provided to flow grease or other lubricant through channels 242 to facilitate the pivotal movement of upper and lower pivot members 224, 226 relative to bushings 222. As such, upper and lower pivot members 224, 226 rotate with each longitudinal frame member 62A, 62B, 68A, 68B when forward and rearward sections 58, 60 of roll cage 50 fold forward, as further detailed herein.

By providing each longitudinal frame member 62A, 62B, 68A, 68B of roll cage 50 with pivot devices 132, longitudinal frame members 62A, 62B, 68A, 68B may remain spaced apart from each other. As such, it is not necessary to join longitudinal frame members 62A, 62B or 68A, 68B at a single pivot device 132. In this way, roll cage 50 may have greater strength and stability than if longitudinal frame members 62A, 62B and/or longitudinal frame members 68A, 68B were coupled together at a single pivot device 132. In particular, a single pivot device 132 may weaken roll cage 50. Additional details of roll cage 50 may be provided in U.S. Pat. No. 7,871,106, filed Mar. 17, 2008, titled "METHOD AND APPARATUS RELATED TO TRANSPORTABILITY OF A VEHICLE", Docket No. PLR-06-2019.05P-01, the complete disclosure of which is expressly incorporated by reference herein.

Referring now to FIGS. 1-3, cab 18 further includes a plurality of operator controls 170 supported by dashboard assembly 36 and by which the operator may provide inputs to control vehicle 10. In one embodiment, controls 170 include a steering wheel 172 and foot pedals (not shown). The position of steering wheel 172 may be adjustable. For example, steering wheel 172 may include an adjustment device (not shown), such as a spring or shock, to tilt or rotate steering wheel 172 in a generally upward or downward direction in order to facilitate rapid entry into and exit from vehicle 10.

The foot pedals of operator controls 170 are actuatable by the operator to control the acceleration and speed of vehicle 10 through the control of engine 274 (FIG. 21) and a braking system (not shown). Additional details regarding operator controls 170, are provided in U.S. Pat. No. 7,819,220, filed Jul. 28, 2006, titled "SIDE-BY-SIDE ATV", Docket No. PLR-06-1688.01P, the complete disclosure of which is expressly incorporated by reference herein.

Figure 11:
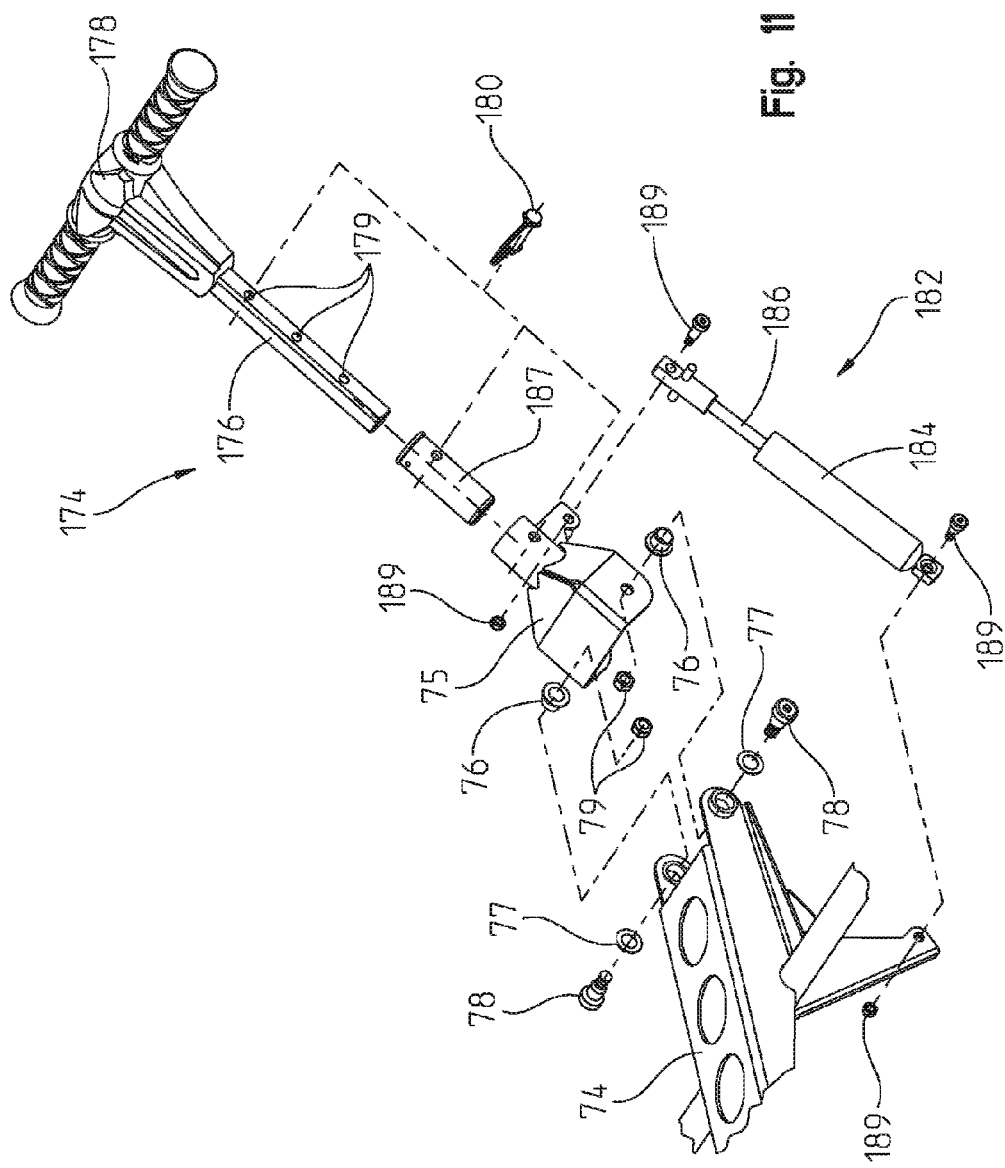
FIG. 11 is an exploded view of the grab handle of FIG. 10.
Figure 12:
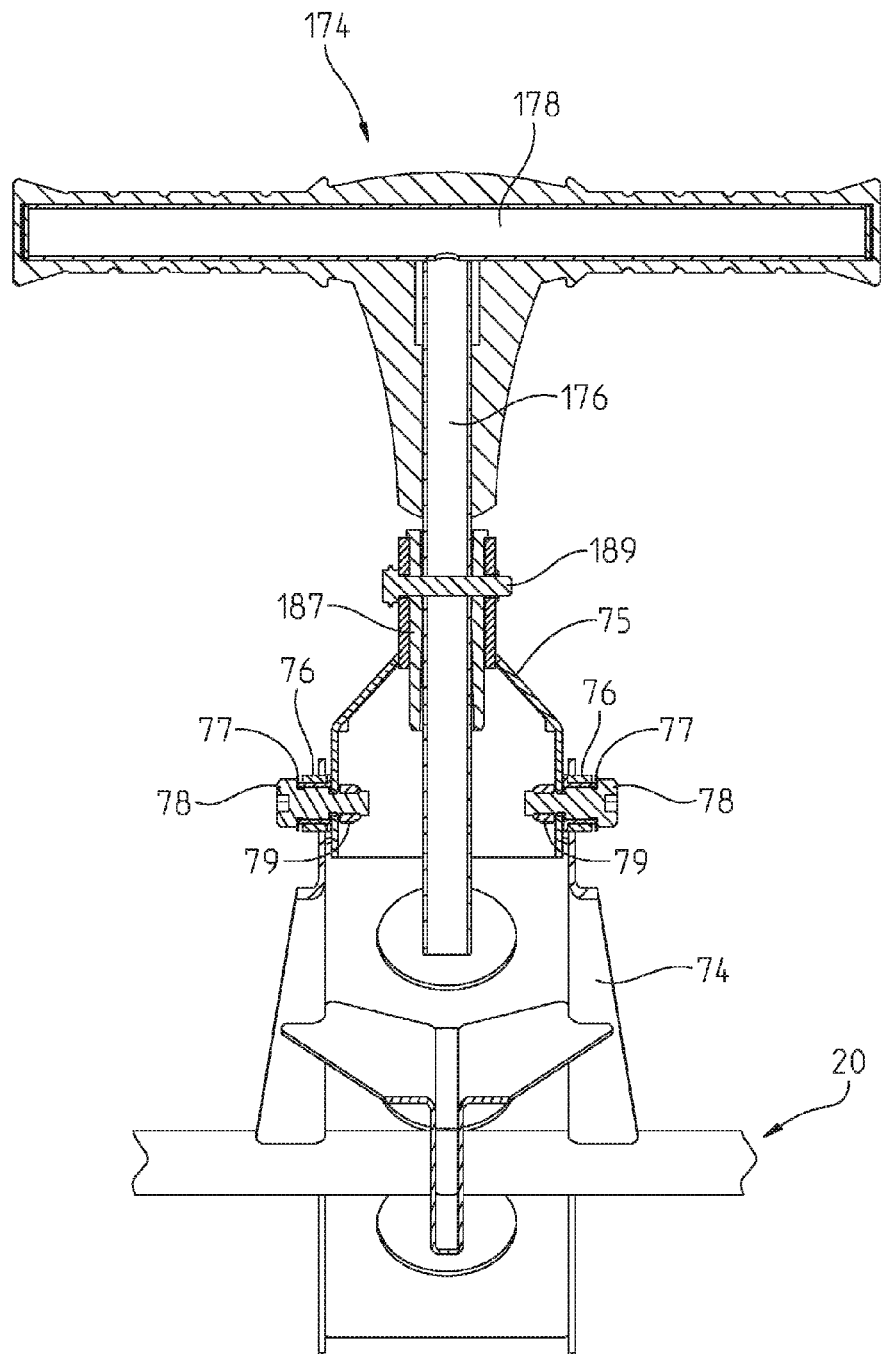
FIG. 12 is a cross-sectional view of the grab handle of FIG. 10, taken along line 12-12 of FIG. 10.

Seating area 150 may include a grab bar or handle 174 supported on dashboard assembly 36. As shown in FIGS. 1-3, a front passenger may hold grab bar 174 for additional stability during operation of vehicle 10. Illustratively, as shown in FIGS. 10-12, grab bar 174 is a T-handle having a shaft 176 and a handle 178, however, grab bar 174 may be configured in other arrangements. Handle 178 is illustratively perpendicular to shaft 176 and may be covered with a gripping material, for example, a polymeric material. Grab bar 174 is illustratively adjustable in a plurality of directions.

Shaft 176 of grab bar 174 may include a plurality of apertures 179 to adjust the position of grab bar 174. More particularly, shaft 176 may be configured to telescope and includes apertures 179 which are spaced apart along the length of shaft 176 (FIG. 11). Apertures 179 may receive a pin 180 to secure the position of grab bar 174. In this way, a first range of motion of grab bar 174 includes adjusting grab bar 174 in forward and rearward directions, thereby accommodating the ergonomic preference of many different front passengers.

Additionally, grab bar 174 may be configured to rotate or tilt in the same manner as steering wheel 172. As shown in FIGS. 10 and 11, grab bar 174 further includes an adjustment device 182, illustratively a gas spring or shock, which allows grab bar 174 to tilt upwardly or downwardly. As such, a front passenger may tilt grab bar 174 upwardly to facilitate rapid entry into and exit from vehicle 10. Similarly, the front passenger may tilt grab bar 174 downwardly when in vehicle 10 in order to easily hold on to grab bar 174 during operation of vehicle 10. In this way, adjustment device 182 allows grab bar 174 to have a second range of motion in an upward or downward direction.

Referring to FIGS. 10 and 11, adjustment device 182 includes a cylinder 184, a movable piston rod 186, a sleeve 187, and fasteners 189. A lever (not shown) is operably coupled to piston rod 186 and is configured to selectively block fluid flow within cylinder 184. In operation, the lever is in a rest position when it blocks fluid flow and locks rod 186, and hence grab bar 174, in a specific position. Activation of the lever permits fluid flow within cylinder 184 and, thus permits adjustment of rod 186, and grab bar 174. Adjustment device 182 may comprise a Bloc-O-Lift® gas spring available from Stabilus.

Adjustment device 182 is supported on chassis 30 and grab bar 174. In particular, adjustment device 182 is coupled to a frame member 74, which is positioned below dashboard assembly 36 (FIGS. 1-3), with fasteners 189. A tilting arm 75 and sleeve 187 may be coupled to shaft 176 and frame member 74. In particular, tilting arm 75 supports the movement of grab bar 174 when adjustment device 182 is activated. A bushing 76, a washer 77, and fasteners 78, 79 may be used to couple tilting arm 75 with frame member 74. As shown, fastener 78 may be a bolt or other similar coupler and fastener 79 may be a nut or other coupler that is complementary to fastener 78.

Referring to FIGS. 13-15, vehicle 10 further includes a running board assembly 250 spaced laterally outward from chassis 30 and below foot plates 43 (FIGS. 1-3). However, running board assembly 250 does not extend outwardly more than front fenders 34 (FIGS. 1-3). As such, running board assembly 250 does not increase the width of vehicle 10. Running board assembly 250 may be coupled to chassis 30 and/or frame rails 28 to increase the overall stability and strength of vehicle 10. Additionally, running board assembly 250 facilitates entry into and exit from vehicle 10 because an operator or passenger may step onto running board assembly 250 when entering and exiting vehicle 10.

Running board assembly 250 includes running board plates 252, running board frame members 254, and support members 256, 258. Running board plates 252 extend in the longitudinal direction of vehicle 10 and, in particular, along the length of cab 18 which allows the operator, front passenger, and rear passengers to access running board assembly 250. Running board plates 252 may be extruded from a metallic material, for example steel. Running board plates 252 illustratively include a plurality of raised apertures 260 to provide traction when an operator or passenger steps on running board plates 252. Apertures 260 also allow dirt or other matter to fall through, which further facilitates traction.

Running board plates 252 may include a lip 262 along an inner edge of running board plates 252. Lip 262 may engage chassis 30 and may be coupled thereto with conventional fasteners (not shown). Additionally, running board plates 252 may be further coupled to chassis 30 with running board frame members 254. In particular, an outer edge of running board plates 252 may be coupled to running board frame members 254, which are coupled to chassis 30 with conventional fasteners (not shown).

Additionally, running board plates 252 may be coupled to frame 20 with support members 256, 258. Illustratively, each running board plate 252 includes two support members 256 and one support member 258, although alternative embodiments may be contemplated. Two or more couplers (not shown) are received through slots 264 of support members 256 in order to couple running board plates 252 to frame 20. Similarly, four or more fasteners (not shown) are received through slots 266 of support members 258 in order to couple running board plates 252 to frame 20.

Referring to FIGS. 16-21, cargo area 100 of vehicle 10 includes a support plate 102, side frames 104, and a rear frame or wall 106 to store and transport cargo items. Optionally, cargo area 100 may further include side walls 108 coupled to side frames 104. Cargo area 100 is supported on vehicle 10 rearward of rear passenger seats 164. Rear frame member 48 may be removably coupled to side frames 104 with conventional fasteners 110. Side frames 104 are illustratively U-shaped and may include multiple frame members coupled together to define side frames 104. Side walls 108 are coupled to side frames 104 with conventional fasteners 112.

Support plate 102 extends between side frames 104 and between rear frame member 48 and rear frame 106. Cargo items may be supported on support plate 102 and retained within cargo area 100 by side walls 108 and rear frame 106. Additionally, support plate 102 includes a plurality of attachment members for securing cargo. More particularly, the attachment members may include rails 114 and tie-down rods 116. Rails 114 may be received within recessed channels 115 of support plate 102. A fastener, for example a bolt, hook, or latch, may be slidably received within rails 114 to provide a coupling surface for a bungee, strap, chord, cable, or other similar device that is used to secure cargo within cargo area 100. Similarly, chords, cables, straps, or bungees can be secured onto tie-down rods 116 to also retain cargo within cargo area 100. Additionally, rails 114 and tie-down rods 116 may be used for other applications, such as transport of vehicle 10.

Figure 16:
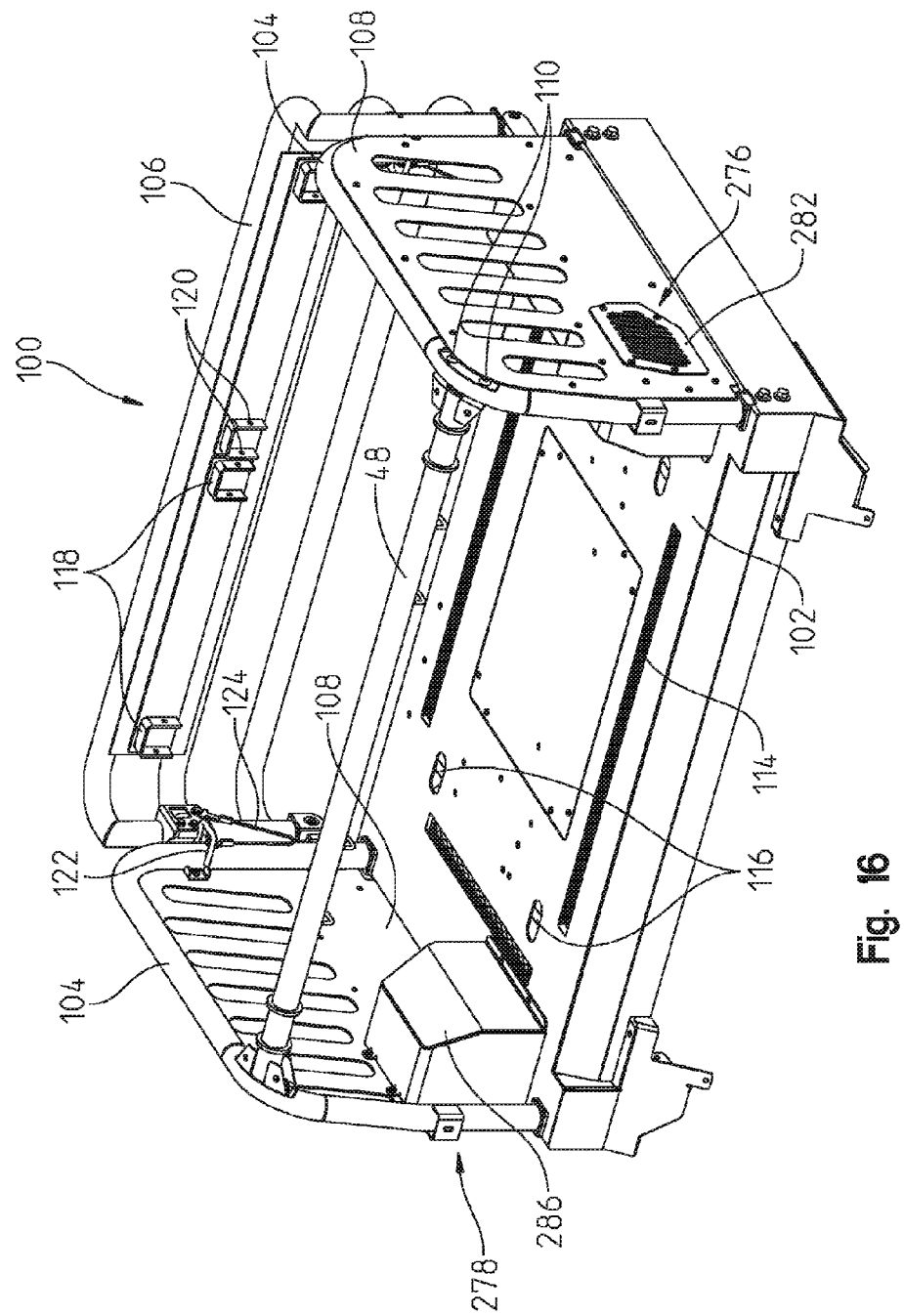
FIG. 16 is front perspective view of a cargo area of the present disclosure.
Figure 17:
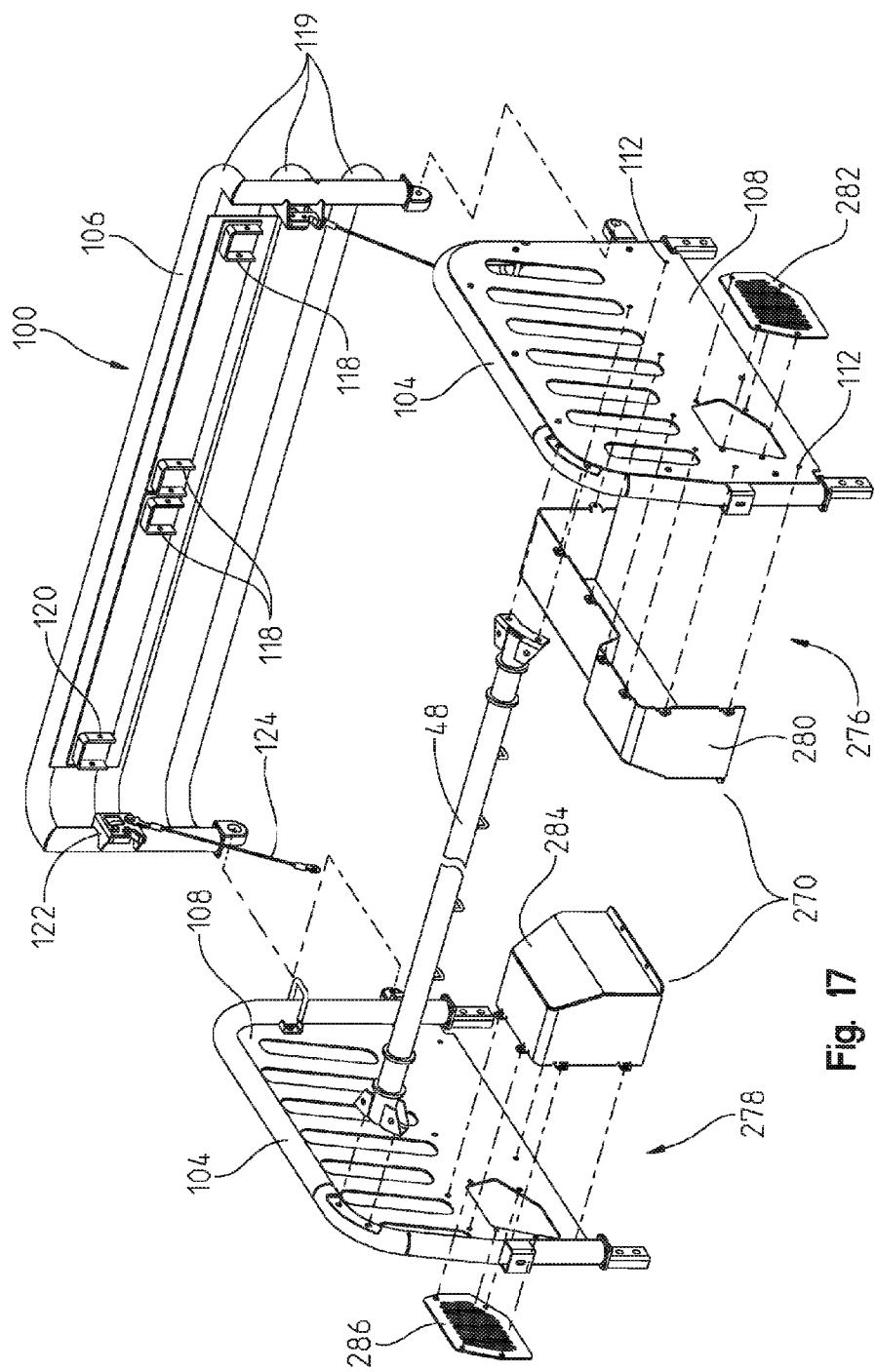
FIG. 17 is an exploded view of the cargo area of FIG. 16.
Figure 18:
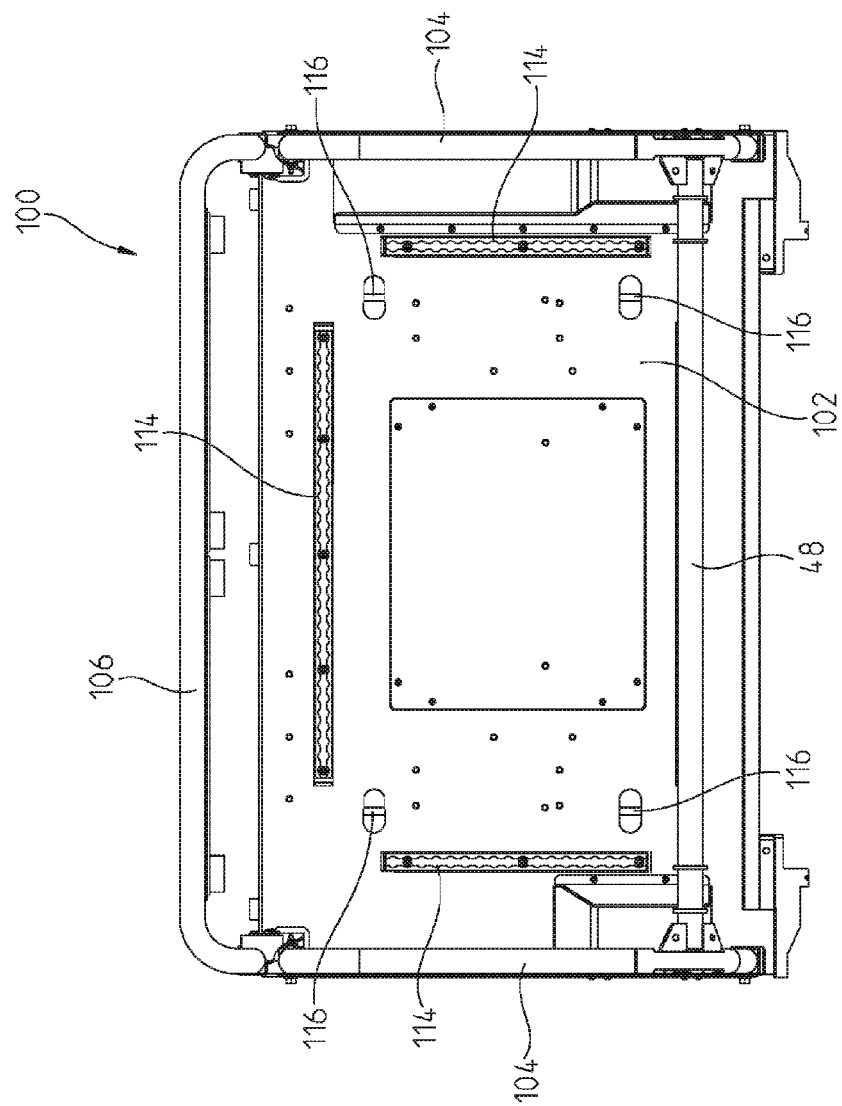
FIG. 18 is a top elevational view of the cargo area.
Figure 19:
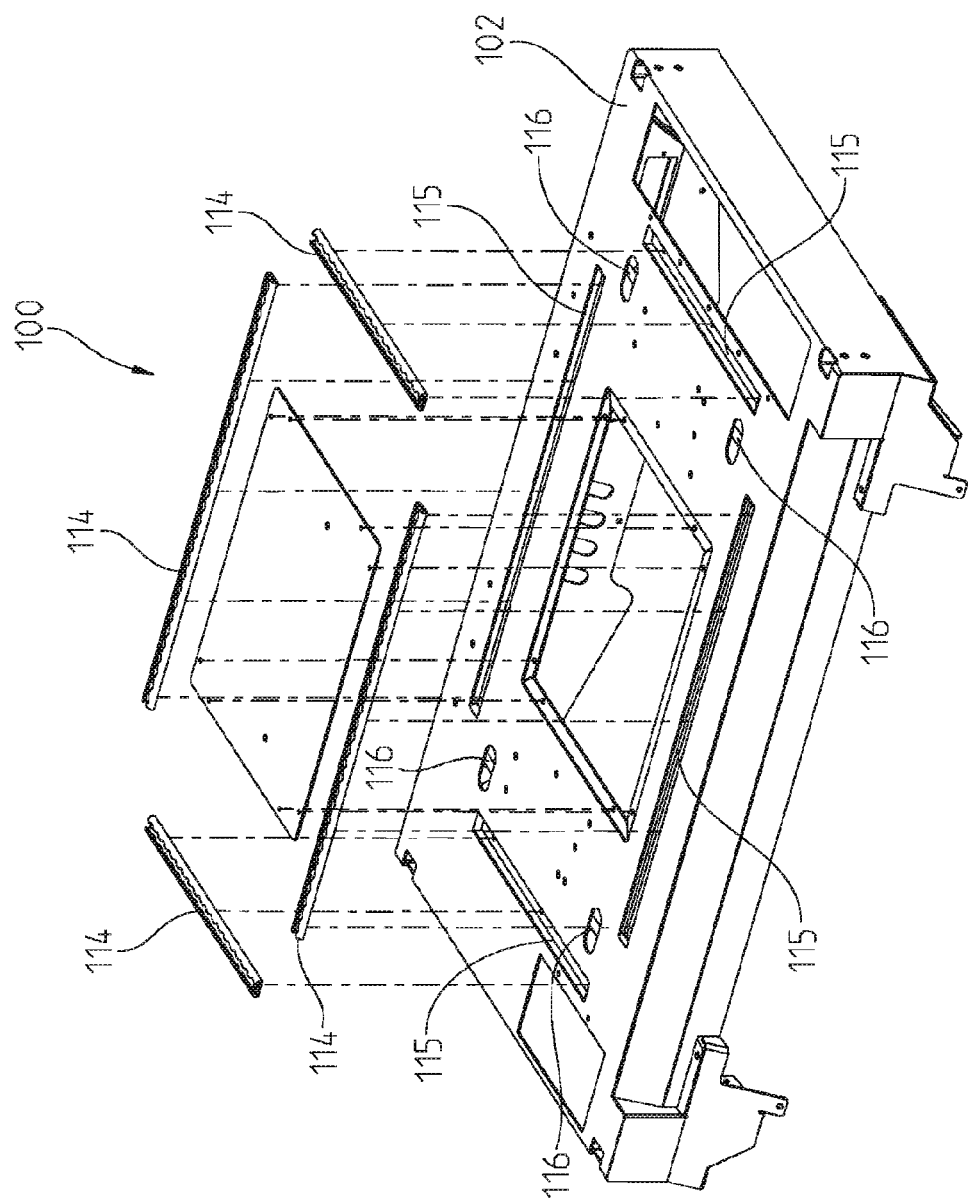
FIG. 19 is an exploded view of a support plate of the cargo area of FIG. 16.
Figure 20:
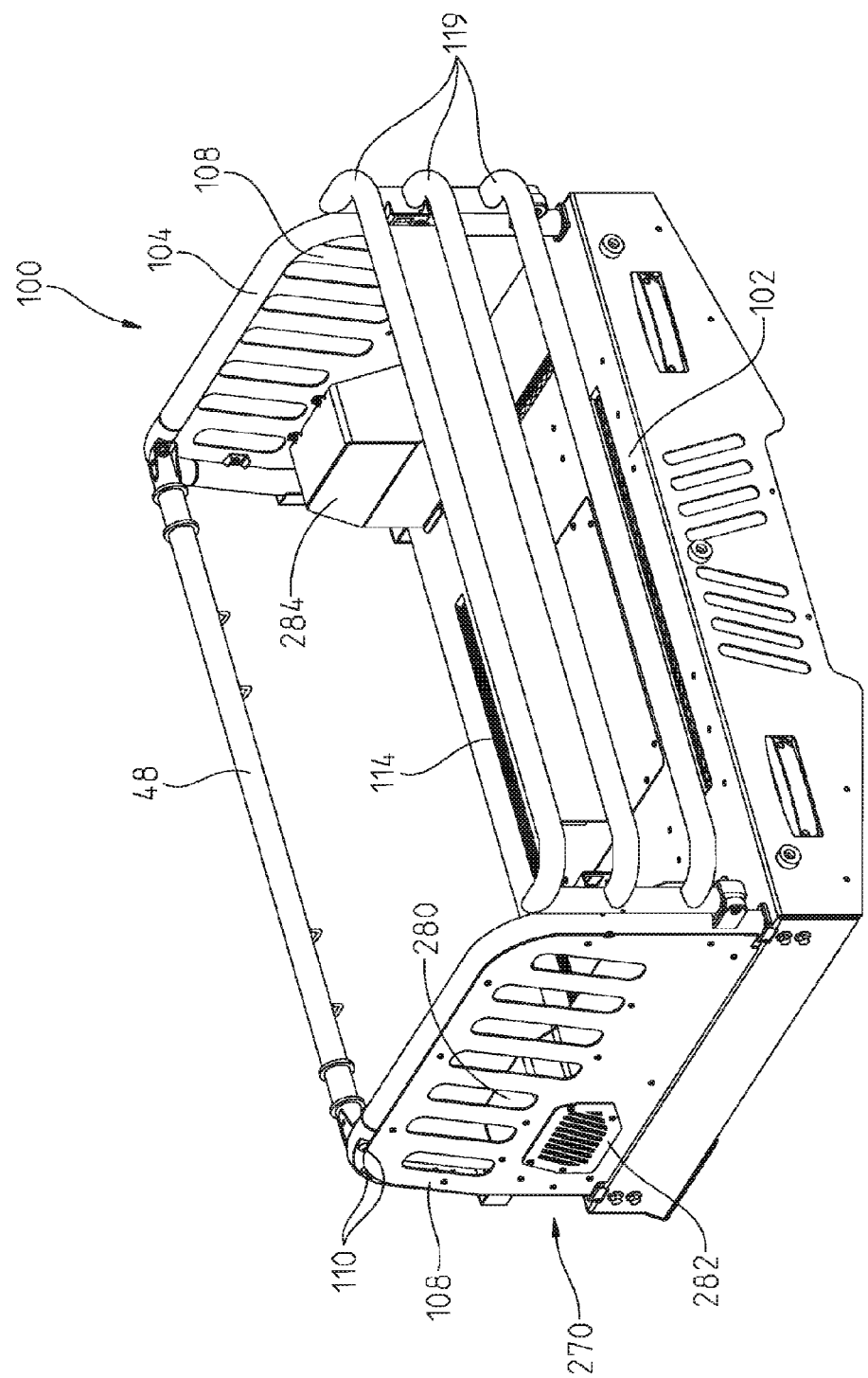
FIG. 20 is a rear perspective view of the cargo area.

As shown in FIGS. 16 and 17, rear frame 106 illustratively is a pivotable tailgate configured to couple with a chord, cable, bungee, or strap to secure cargo. Rear frame 106 includes vertical attachment members 118 positioned between horizontally extending frame members 119. Vertical attachment members 118 have a plurality of apertures 120 that may receive a chord, cable, bungee, or strap. The other end of the chord, cable, bungee, or strap can then be used to retain cargo in cargo area 100 or can be used for other applications. As shown, rear frame 106 is in a latched position, wherein a coupling mechanism 122 secures rear frame 106 to side frames 104. A steel cable 124 may be used to lower rear frame 106 in an unlatched position. By disengaging coupling mechanism 122, rear frame 106 may be pivoted to the unlatched position and held in the unlatched position with cable 124.

Cargo area 100 also may be configured to support a portion of an air intake system 270 of vehicle 10. In particular, air intake system 270 is operably coupled to drivetrain assembly 16, and, in particular to CVT 272 and engine 274. As shown in FIGS. 16 and 21, an air intake 276 is positioned on the operator's side of vehicle 10 and is operably coupled to engine 274. Air intake 276 is surrounded by a housing 280, which may be coupled to side wall 108 and support plate 102 of cargo area 100. A cover 282 may be secured to side wall 108 to conceal the opening of air intake 276. Similarly, an air intake 278 is positioned on the opposing side of vehicle 10 and is operably coupled to CVT 272. Air intake 278 is surrounded by a housing 284, which may be coupled to side wall 108 and support plate 102. Air intake 278 also may include a cover 286 to conceal the opening of air intake 278. Cover 286 may be coupled to side wall 108. Additional details of air intake system 270 may be provided in U.S. Patent Application Publication No. 2012/0031693, filed Aug. 3, 2010, titled "SIDE-BY-SIDE VEHICLE," Docket No. PLR-06-24357.01P, the complete disclosure of which is expressly incorporated by reference herein.

Figure 22A:
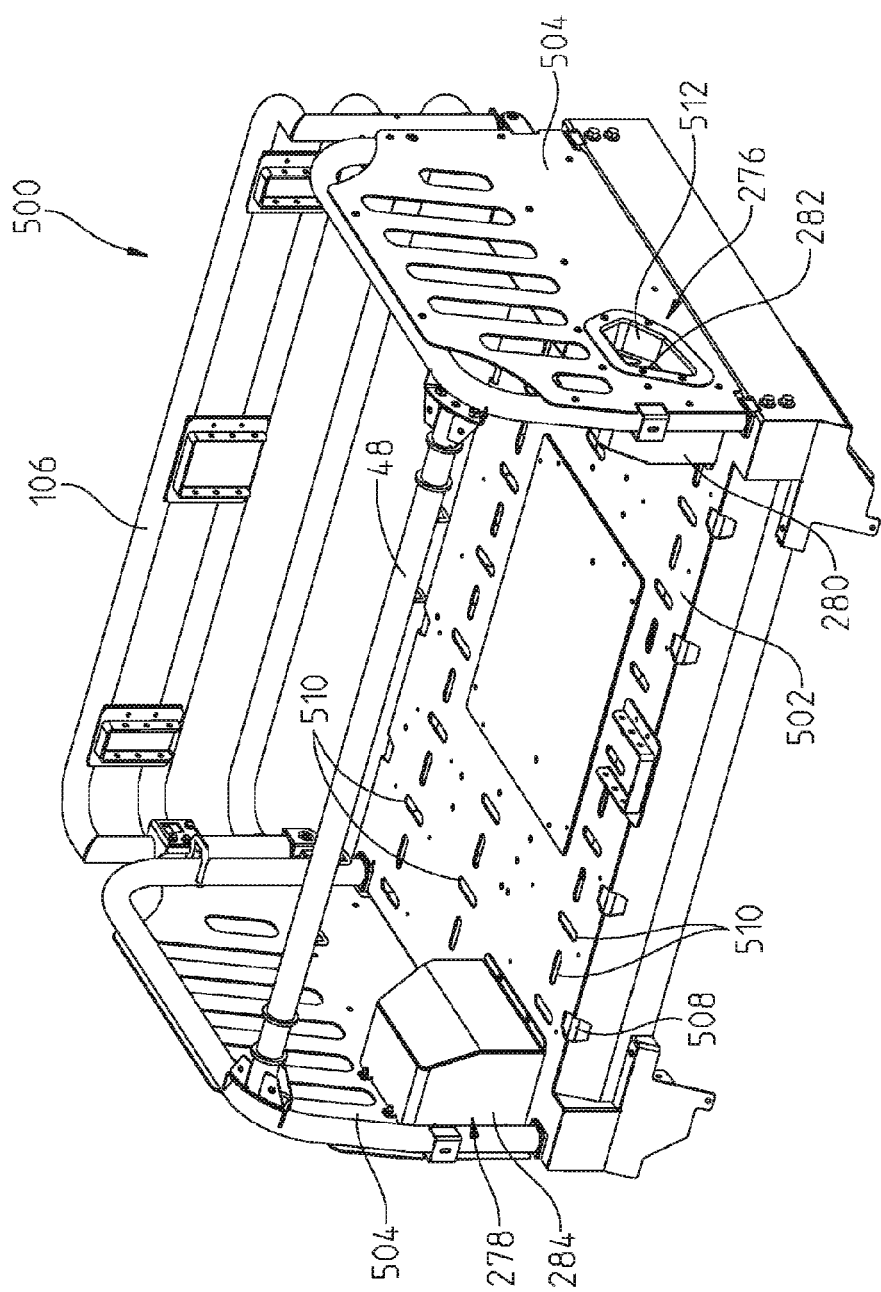
FIG. 22A is a front perspective view of an alternative embodiment of the cargo area of FIG. 16.
Figure 22B:
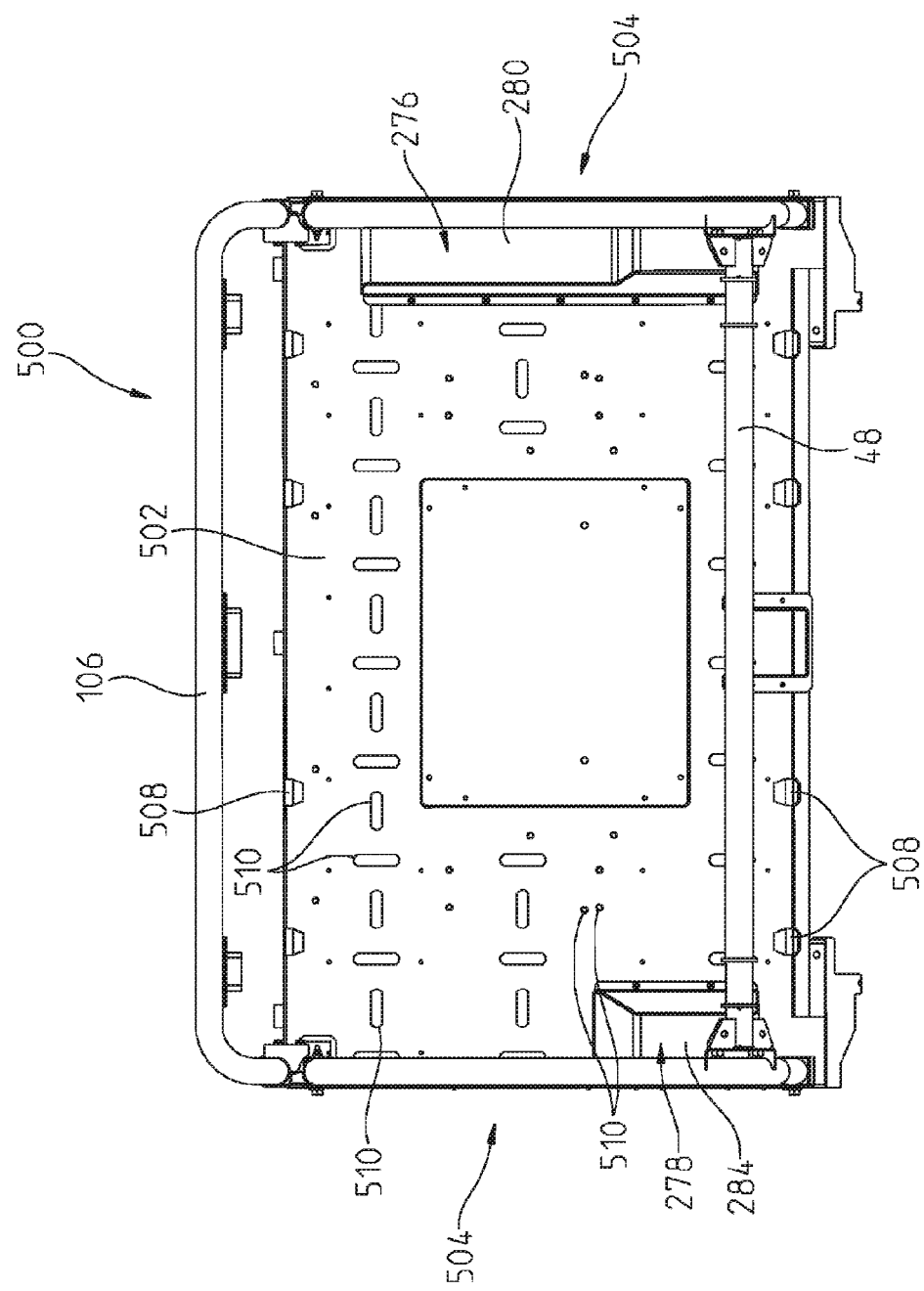
FIG. 22B is a top elevational view of the cargo area of FIG. 22A.

Alternatively, as shown in FIGS. 22A and 22B, vehicle 10 may include cargo area 500. Cargo area 500 of FIGS. 22A and 22B is similar to cargo area 100 of FIGS. 1-3 and 16-21, with like reference numbers indicating like parts having like structure and like functionality, except as detailed hereinafter. In particular, cargo area 500 includes a support plate 502, side walls 504, and rear frame 106 (FIG. 21). Cargo area 500 includes a plurality of coupling locations, illustratively tie-down rods 508 and apertures 510, on support plate 502. In particular, tie-down rods 508 may be generally positioned at the front of cargo area 500 and below rear frame member 48. Additionally, tie-down rods 508 may be generally positioned at the rear of cargo area 500 near rear frame 106, and along a middle portion of support plate 502.

Apertures 510 are illustratively positioned inward from side walls 504, however, apertures 510 may be located at any position on support plate 502. Apertures 510 may be configured to receive conventional fasteners, such as bolts, hooks, and latches, in order to retain cargo within cargo area 500. Furthermore, apertures 510 may be used to secure rails 114 (FIG. 21) to support plate 502. In particular, fasteners, such as bolts, may be received through apertures (not shown) in rails 114 and through apertures 510 in support plate 502 in order to couple rails 114 to support plate 502. As such, rails 114 may be coupled to the top surface of support plate 502 and the position of rails 114 may be moved or adjusted to accommodate specific cargo. In this way, an operator may position rails 114 in any desired location on support plate 502.

Referring to FIG. 22A, air intake system 270 may be coupled to side walls 504. Air intake 276 is surrounded by housing 280, which may be coupled to side wall 504 and support plate 502 of cargo area 500. Illustratively, side wall 504 includes a recessed portion 512 which receives air intake 276. Cover 282 may be secured to recessed portion 512 of side wall 504 to conceal the opening of air intake 276 in order to prevent sand and other particulate matter or debris from entering air intake 276. Similarly, air intake 278 is surrounded by housing 284, which may be coupled to side wall 504 and support plate 502. Illustratively, side wall 504 includes a recessed portion (not shown) similar to recessed portion 512 which receives air intake 278. Cover 286 (FIG. 17) of air intake 278 may be secured to the recessed portion of side wall 504 to conceal the opening of air intake 278 in order to prevent sand and other particulate matter or debris from entering air intake 278.

During operation or transport of vehicle 10, the height of roll cage 50 may be adjusted to allow vehicle 10 to enter confined spaces, for example an aircraft, or for transportation by parachute or helicopter. In particular, as detailed herein, roll cage 50 may collapse or fold in order to reduce the height of vehicle 10.

Figure 23:
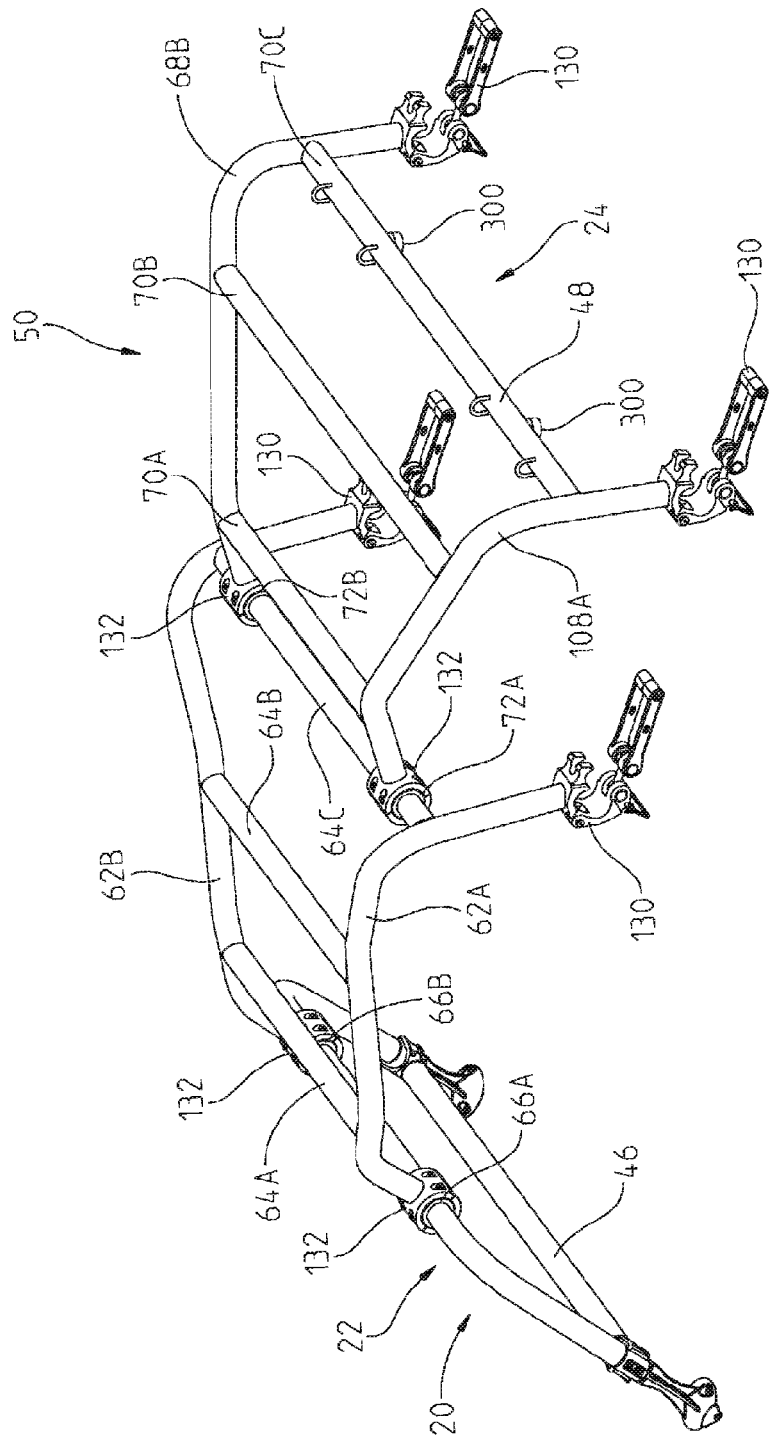
FIG. 23 is a rear perspective view of the roll cage of the present disclosure, when the roll cage is uncoupled from the frame.
Figure 24:
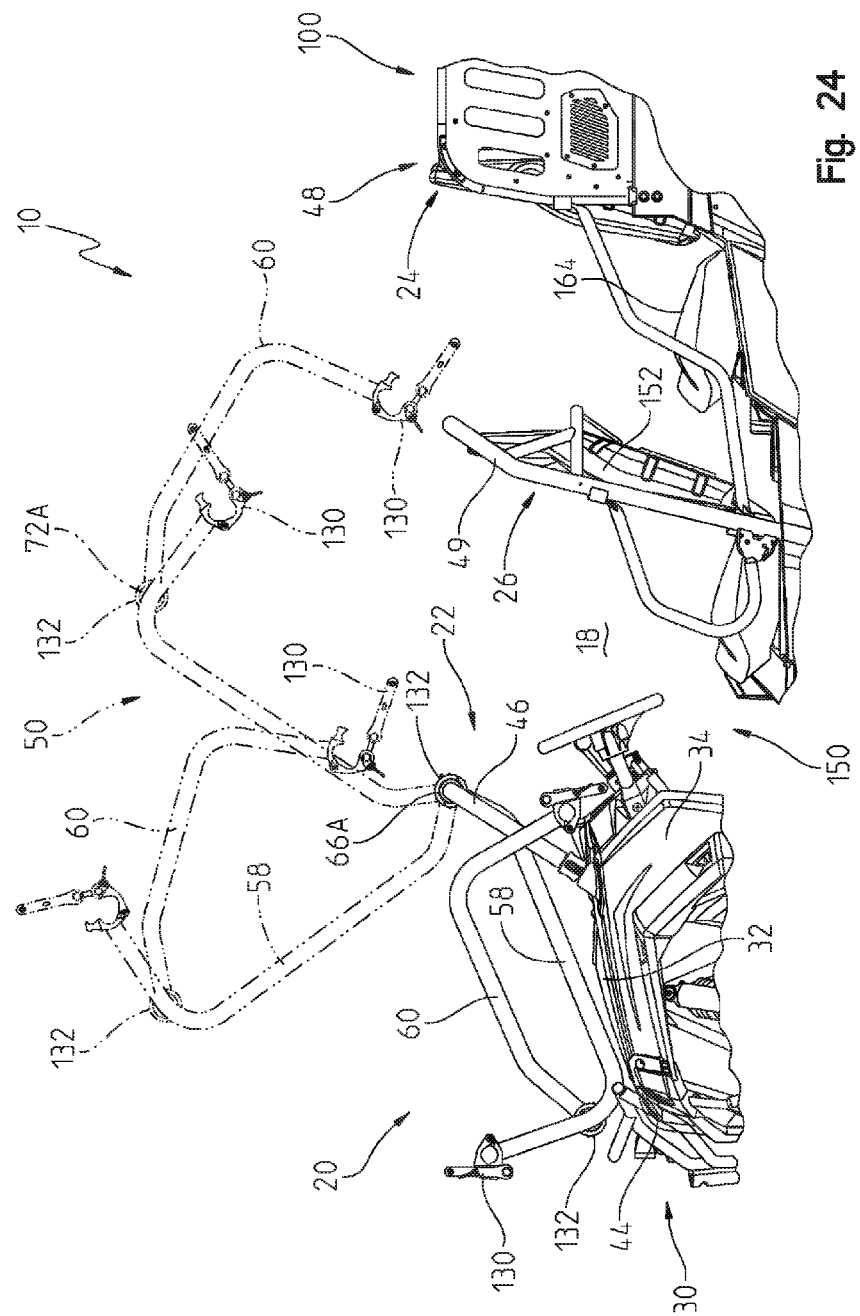
FIG. 24 is a side view of the vehicle of the present disclosure, disclosing illustrative steps of folding the roll cage.

Referring to FIGS. 23 and 24, roll cage 50 may pivot or rotate from a raised position to a lowered position. When in the raised position, roll cage 50 is positioned above seating area 150 and is coupled to rear and intermediate frame members 48, 49. Conversely, when in the lowered position, roll cage 50 is folded forward and is secured to hood 32 of vehicle 10. More particularly, coupling devices 130 and pivot devices 132 cooperate to release forward and rearward sections 58, 60 of roll cage 50 from intermediate frame member 49 and rear frame member 48.

Figure 6C:
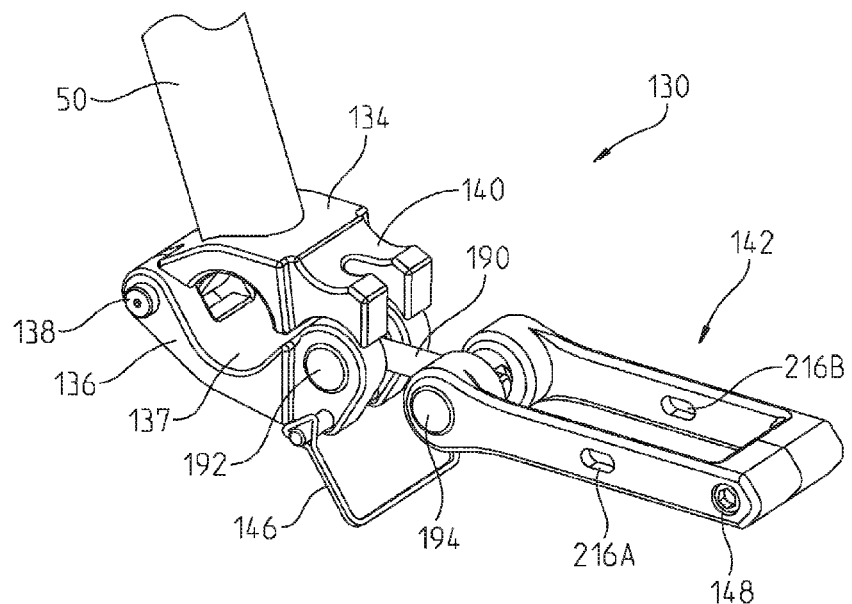
FIG. 6C is a rear perspective view of the coupling device with the handle extending rearwardly.
Figure 6D:
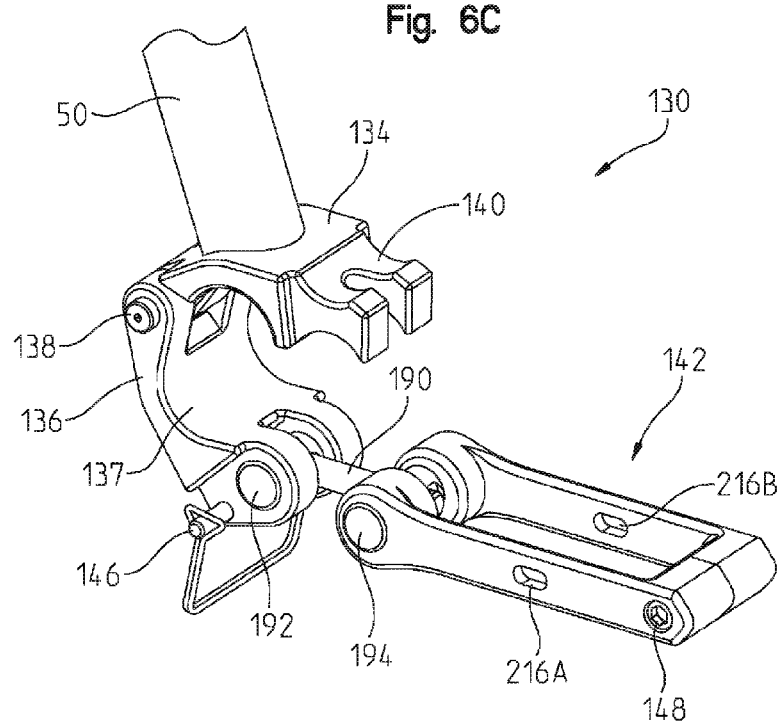
FIG. 6D is a further rear perspective view of the coupling device in an open position.
Figure 7:
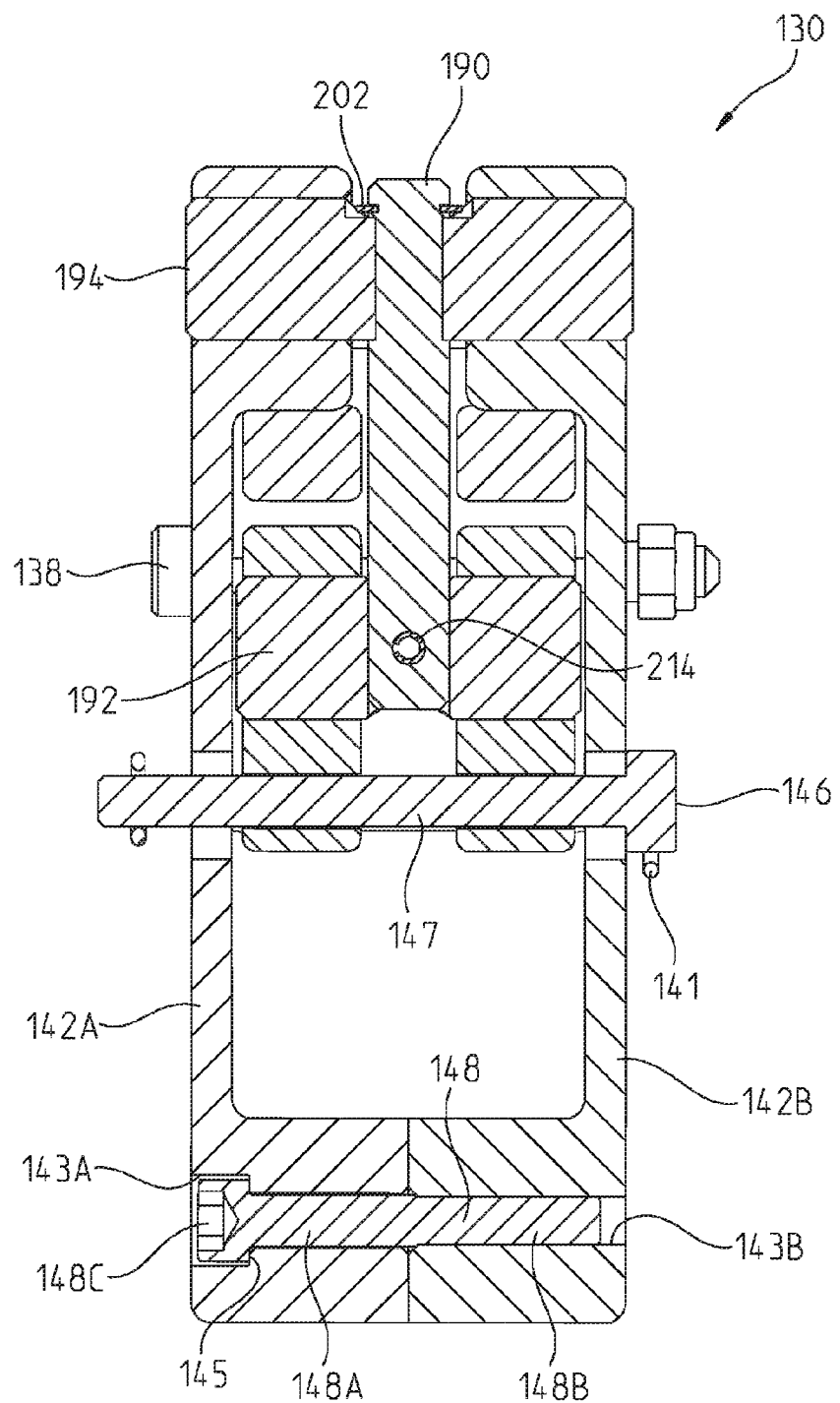
FIG. 7 is a cross-sectional view of the coupling device of FIG. 5.

As shown in FIGS. 6B-6D, an operator may remove locking pins 146 from handles 142 without using tools. Handles 142 may then rotate upwardly and disengage from cam surfaces 140, thereby releasing the clamping force. Lower clamp portion 136 may rotate away from upper clamp portion 134 when handle 142 is released from cam surfaces 140, which also uncouples rear and intermediate frame members 48, 49 from coupling devices 130, as shown in FIGS. 23 and 24. In this way, forward and rearward sections 58 and 60 of roll cage 50 are freely pivotable about pivot points 66A, 66B and 72A, 72B, respectively. As is explained herein, clamps are operable by hand and do not require the use of tools.

When coupling devices 130 are released from intermediate frame member 49 and rear frame member 48, forward section 58 of roll cage 50 is lifted upwardly by hand, thereby also lifting rearward section 60. As such, rearward section 60 is able to pivot in a clockwise direction about pivot devices 132 at pivot points 72A, 72B. More particularly, upper and lower pivot members 224, 226 pivot about bushings 222 (FIG. 9) such that rearward section 60 may fold or collapse under forward section 58. However, rearward section 60 is still coupled to forward section 58 by pivot devices 132 and cross member 64C. When rearward section 60 is positioned beneath forward section 58, a strap, tie, bungee, cable, chord, or other flexible component (not shown) may be used to secure rearward section 60 to forward section 58. Additionally, longitudinal frame members 68A, 68B may include a plurality of polymeric bumpers 300 (FIG. 23) to prevent damage to longitudinal frame members 62A, 62B, 68A, 68B.

With rearward section 60 coupled to forward section 58, forward section 58 may rotate or pivot in a counterclockwise direction about pivot devices 132 coupled to front frame member 46 at pivot points 66A, 66B. In particular, upper and lower pivot members 224, 226 may rotate relative to bushings 222 (FIG. 9) in order to pivot forward and rearward sections 58, 60 toward hood 32. When forward and rearward sections 58, 60 are both supported on hood 32 in the lowered position, a strap, cable, bungee, or similar flexible component (not shown) may be used to secure roll cage 50 to front brush guard 44, hood 32, or front fenders 34. As such, the height of vehicle 10 is reduced when roll cage 50 is in the lowered position. The process of collapsing or folding roll cage 50 does not require tools (e.g., is toolless) and may be done by hand.

As has been detailed herein, roll cage 50, including both forward and rearward sections 58, 60, is pivoted in a forward direction by a compound movement toward hood 32, rather than in a rearward direction toward cargo area 100. Both forward and rearward sections 58, 60 remain coupled together and, therefore, both fold in a forward direction. As such, cargo area 100 remains open and available for storing and supporting cargo items. Additionally, it may be preferred to remove rear frame member 48 after rearward section 60 of roll cage 50 is folded forward and stored in the lowered position. Fasteners 110 are removed from rear frame member 48 and side frames 104 of cargo area 100 in order to remove rear frame member 48 therefrom.

Referring to FIGS. 25-31, vehicle 10' may alternatively include only operator seat 152 and front passenger seat 158, thereby accommodating up to two people rather than up to four people, as was previously described. Vehicle 10' of FIGS. 25-31 includes features similar to those of vehicle 10 of FIG. 1-24, with like reference numerals indicating like elements having like functionality and structure, except as described below.

Figure 25:
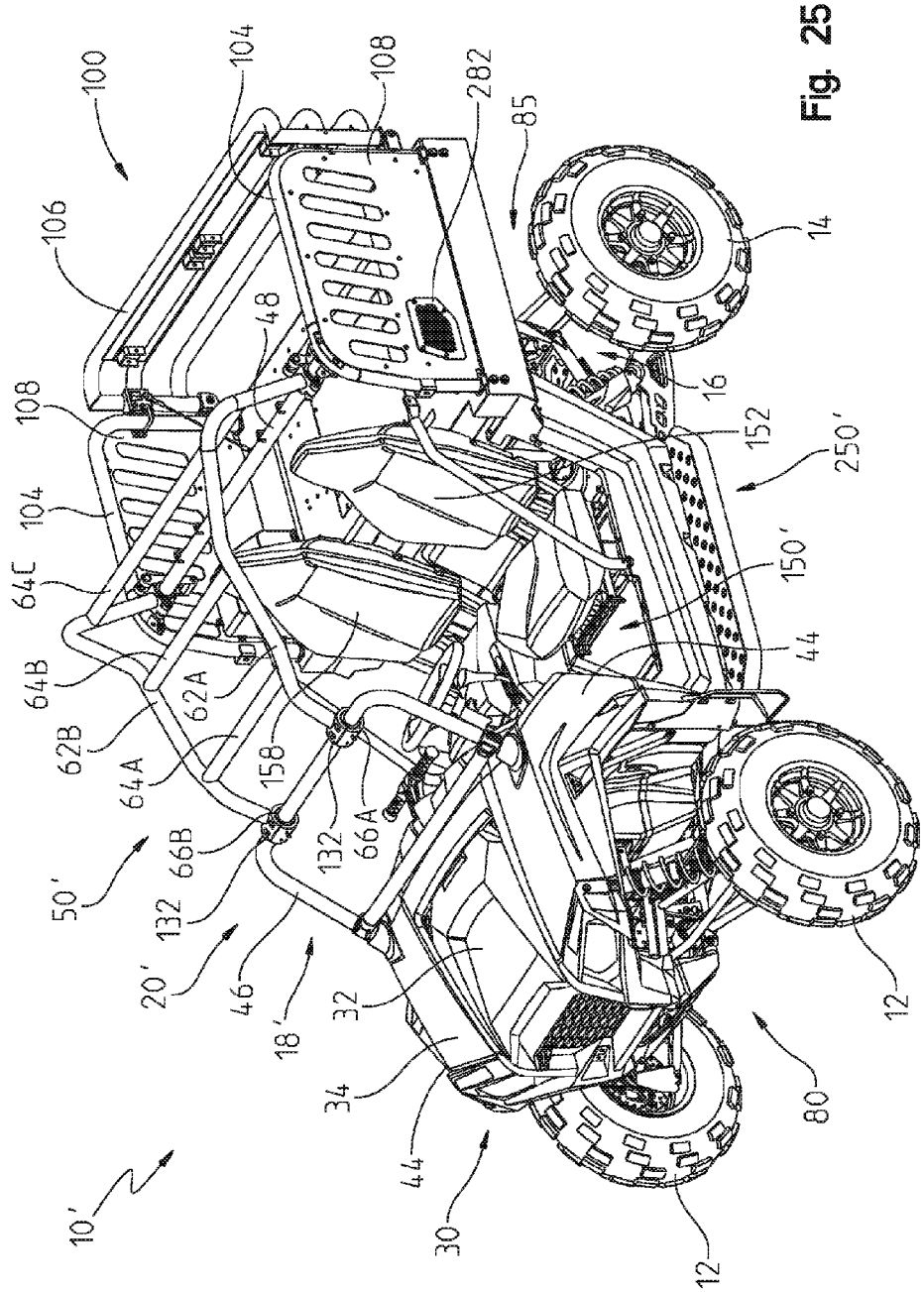
FIG. 25 is a front perspective view of an alternative embodiment vehicle of the present disclosure.
Figure 26:
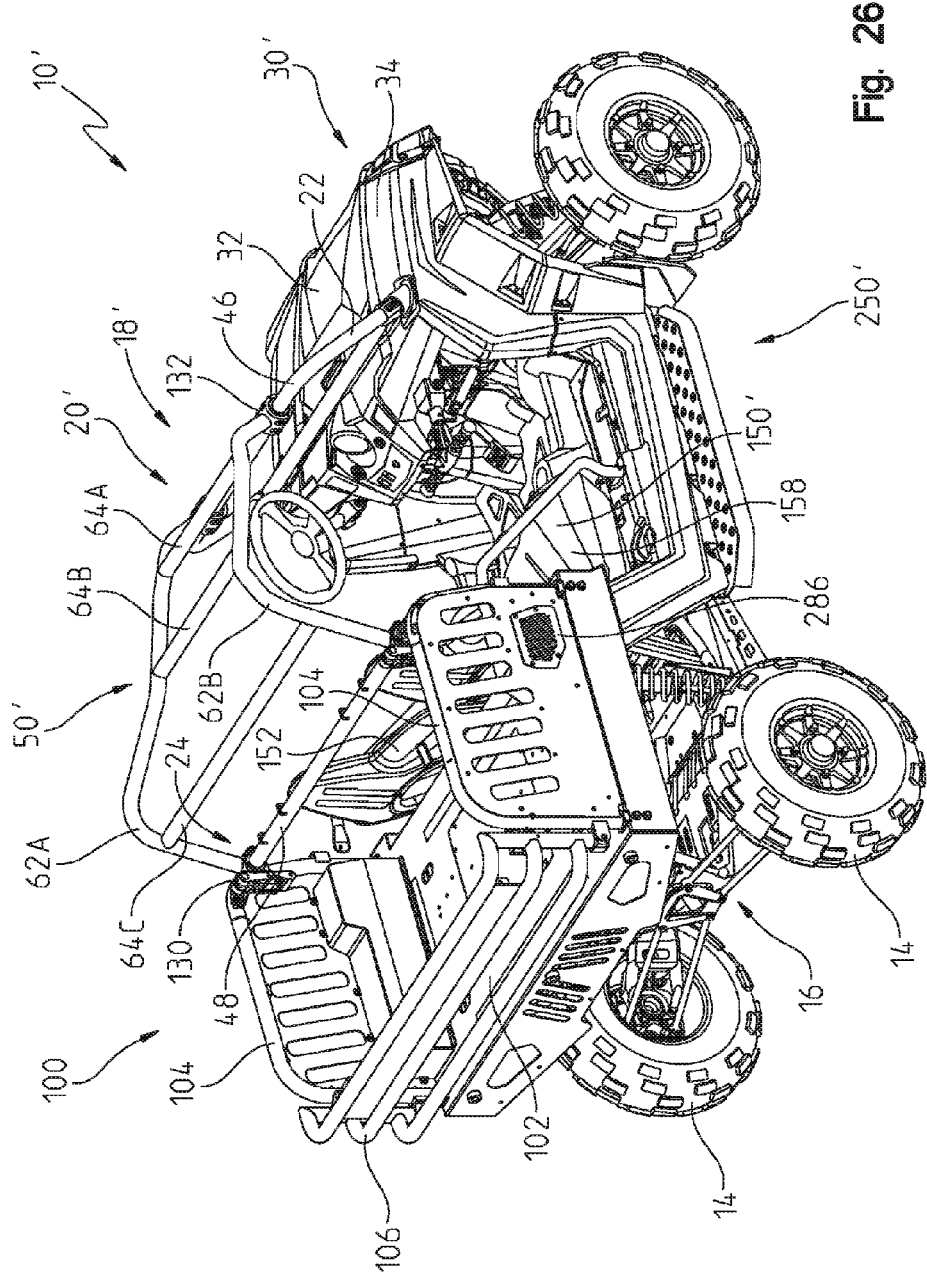
FIG. 26 is a rear perspective view of the vehicle of FIG. 25.
Figure 27:
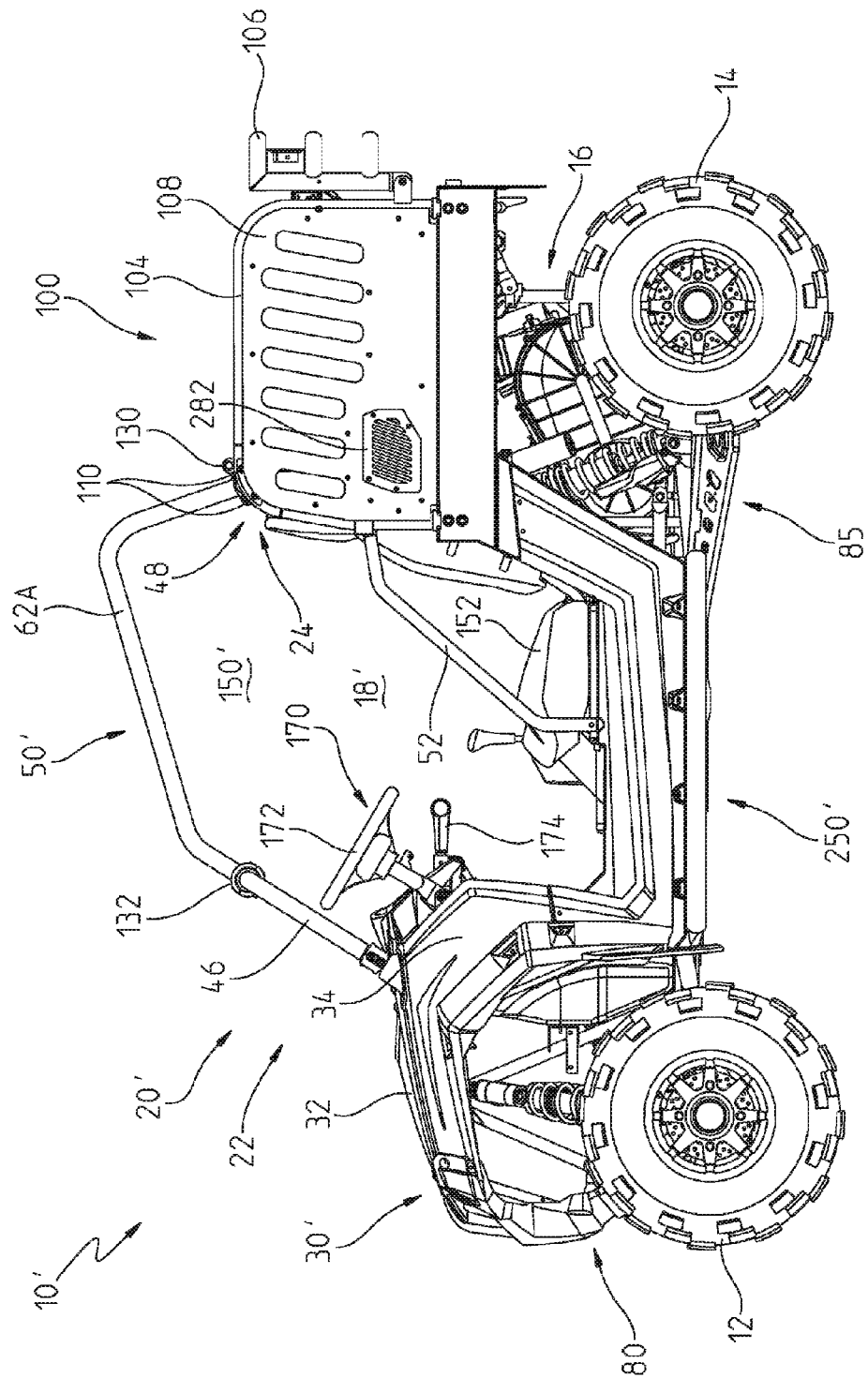
FIG. 27 is a side elevational view of the vehicle of FIG. 25.
Figure 28:
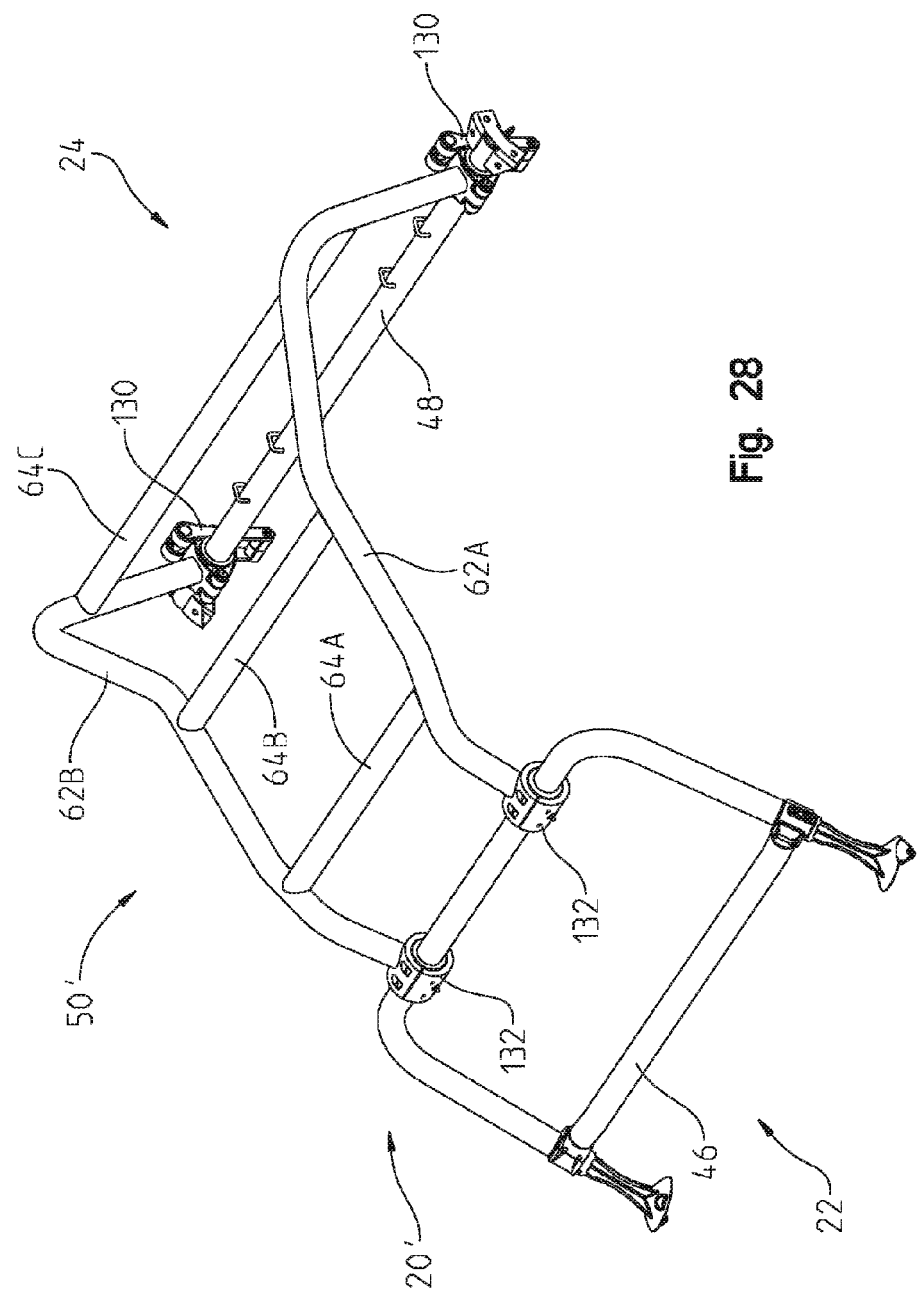
FIG. 28 is a front perspective view of a roll cage and frame of the vehicle of FIG. 25.

Referring to FIGS. 25-27, vehicle 10' includes seating area 150' supported by chassis 30' and frame 20', and which includes operator seat 152 and passenger seat 158 in a side-by-side arrangement. Bolster members 52' may be coupled to chassis 30' and side frames 104 of cargo area 100, or alternatively to side walls 504 of cargo area 500 (FIGS. 22A and 22B), and positioned adjacent operator seat 152 and passenger seat 158 to retain the operator and/or passenger in vehicle 10'. Vehicle 10' also comprises roll cage 50' coupled to frame 20' and cooperating with seating area 150' to define cab 18' of vehicle 10'.

Referring to FIG. 27, frame 20' includes front frame portion 22 and rear frame portion 24. Front frame portion 22 illustratively includes front frame member 46 positioned forward of seating area 150'. Front frame member 46 may be coupled to chassis 30' and/or to other components of frame 20', for example frame rails (not shown). Front frame member 46 may support a windshield (not shown). As shown in FIGS. 24 and 25, rear frame portion 24 illustratively includes rear frame member 48, which may be removably coupled to cargo area 100. Rear frame member 48 is rearward of seating area 150'.

Figure 29:
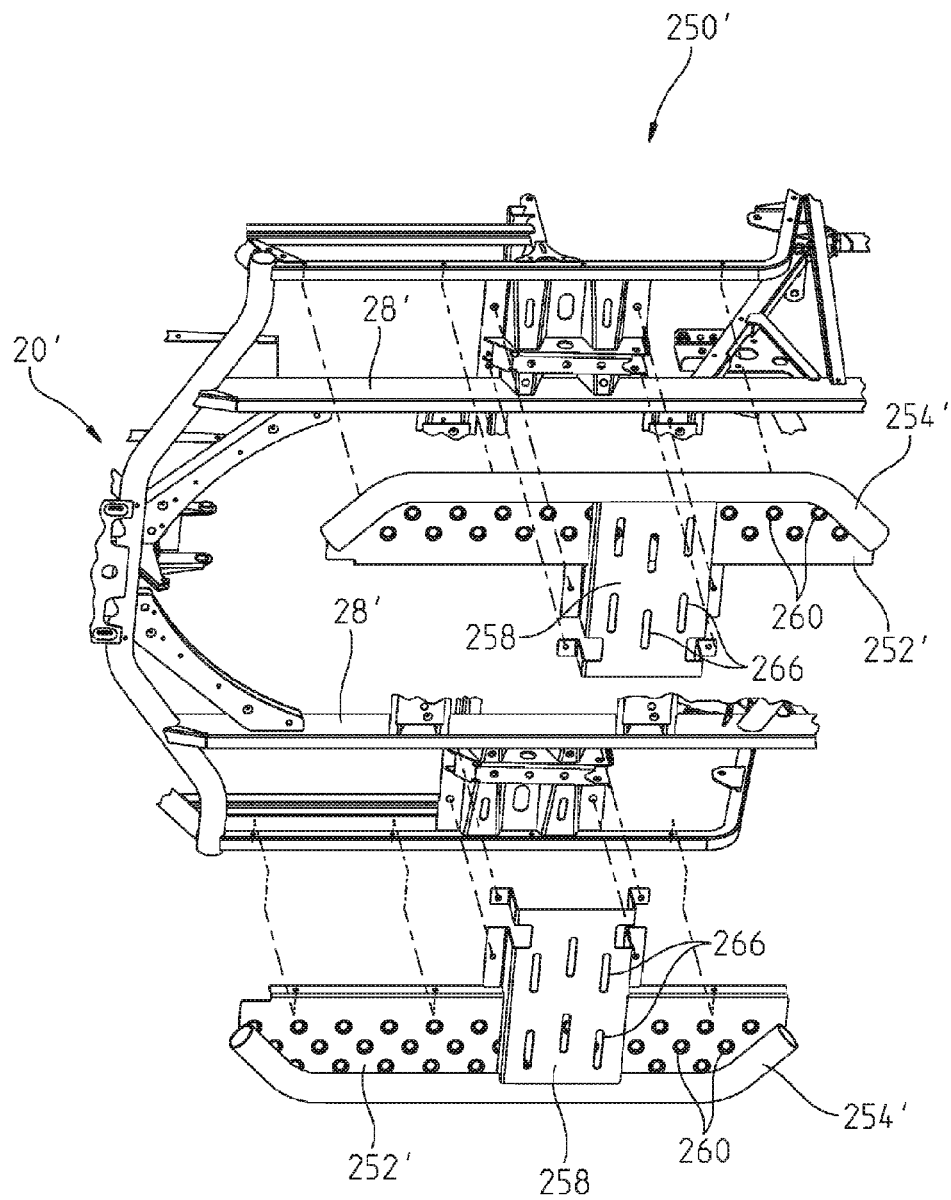
FIG. 29 is an exploded view of a running board assembly of the vehicle of FIG. 25.

Referring to FIGS. 27 and 29, roll cage 50' is positioned above seating area 150' and, therefore, above the operator and passenger. Roll cage 50' illustratively includes longitudinal frame members 62 and cross members 64. More particularly, cross members 64 may be substantially perpendicular to longitudinal frame members 62 and conventionally coupled thereto, for example, through welding, bolts, rivets, and/or adhesive. Illustratively, roll cage 50' includes two longitudinal frame members 62A, 62B and three cross members 64A, 64B, 64C, however, roll cage 50' may not be limited to this arrangement. One end of longitudinal frame members 62A, 62B may be coupled to front frame member 46 at pivot points 66A, 66B, respectively. Additionally, an opposing end of longitudinal frame members 62A, 62B may be removably coupled to rear frame member 48 with coupling devices 130, as is further detailed herein.

Roll cage 50' further includes coupling devices 130 and pivot devices 132. In particular, one end of each longitudinal frame member 62A, 62B includes coupling devices 130 and the opposing end includes pivot devices 132. As detailed above, coupling devices 130 receive rear frame member 48, as shown in FIGS. 25, 26, and 29.

Roll cage 50' further includes pivot device 132. Referring to FIGS. 8A and 9, each longitudinal frame member 62A, 62B includes one pivot device 132 having frame connector 220, at least one bushing 222, upper pivot member 224, and lower pivot member 226. Pivot devices 132 are coupled to front frame member 46 to allow roll cage 50' to pivot forward.

Frame connector 220 is positioned between two components of front frame member 46 and includes body 228, flanges 230, and ends 232. Ends 232 may be received within the components of front frame member 46 until flanges 230 are engaged by the frame components. Frame connectors 220 may be comprised of the same material as the components of front frame member 46 (e.g., steel) and may be conventionally coupled thereto with welds, adhesive, rivets, and/or bolts. In this way, frame connectors 220 form part of front frame member 46.

As shown in FIG. 9, and referring to pivot devices 132, a layer of lubricant may flow through channels 242 between upper and lower pivot members 224, 226 and bushings 222. As such, upper and lower pivot members 224, 226 allow roll cage 50' to pivot forward. More particularly, upper and lower pivot members 224, 226 rotate relative to bushings 222 in order to fold/collapse roll cage 50'.

Referring to FIGS. 25-29, by providing each longitudinal frame member 62A, 62B of roll cage 50' with one pivot device 132, longitudinal frame members 62A, 62B may remain spaced apart from each other. As such, it is not necessary to join longitudinal frame members 62A, 62B at a single pivot point. In this way, roll cage 50' may have greater strength and stability than if longitudinal frame members 62A, 62B were coupled together at a single pivot device 132. In particular, a single pivot device 132 may weaken roll cage 50'.

Referring now to FIG. 29, vehicle 10' further includes running board assembly 250' spaced laterally outward from chassis 30' and below foot plates 43'. Running board assembly 250' may be coupled to chassis 30' and/or frame rails 28' to increase the overall stability and strength of vehicle 10'. Additionally, running board assembly 250' facilitates entry and exit from vehicle 10' because an operator or passenger may step onto running board assembly 250' when entering and exiting vehicle 10'.

Running board assembly 250' includes running board plates 252', running board frame members 254', and support members 258'. Running board plates 252' extend in the longitudinal direction of vehicle 10' and, in particular, along the length of cab 18' which allows the operator and passenger to access running board assembly 250'. Running board plates 252' illustratively include a plurality of raised apertures 260 to provide traction when an operator or passenger steps on running board plates 252'. Apertures 260 also allow dirt or other matter to fall through, which also facilitates traction.

Running board plates 252' may be coupled to frame 20' with support members 258. Illustratively, each running board plate 252' includes one support member 258, although alternative embodiments may be contemplated. Four or more fasteners (not shown) are received through slots 266 of support members 258 in order to couple running board plates 252' to frame 20'.

During operation or transport of vehicle 10', the height of roll cage 50' may be adjusted to allow vehicle 10' to enter confined spaces, for example an aircraft, or for transportation by parachute or helicopter. In particular, as detailed herein, roll cage 50' may collapse or fold in order to reduce the height of vehicle 10'.

Figure 30:
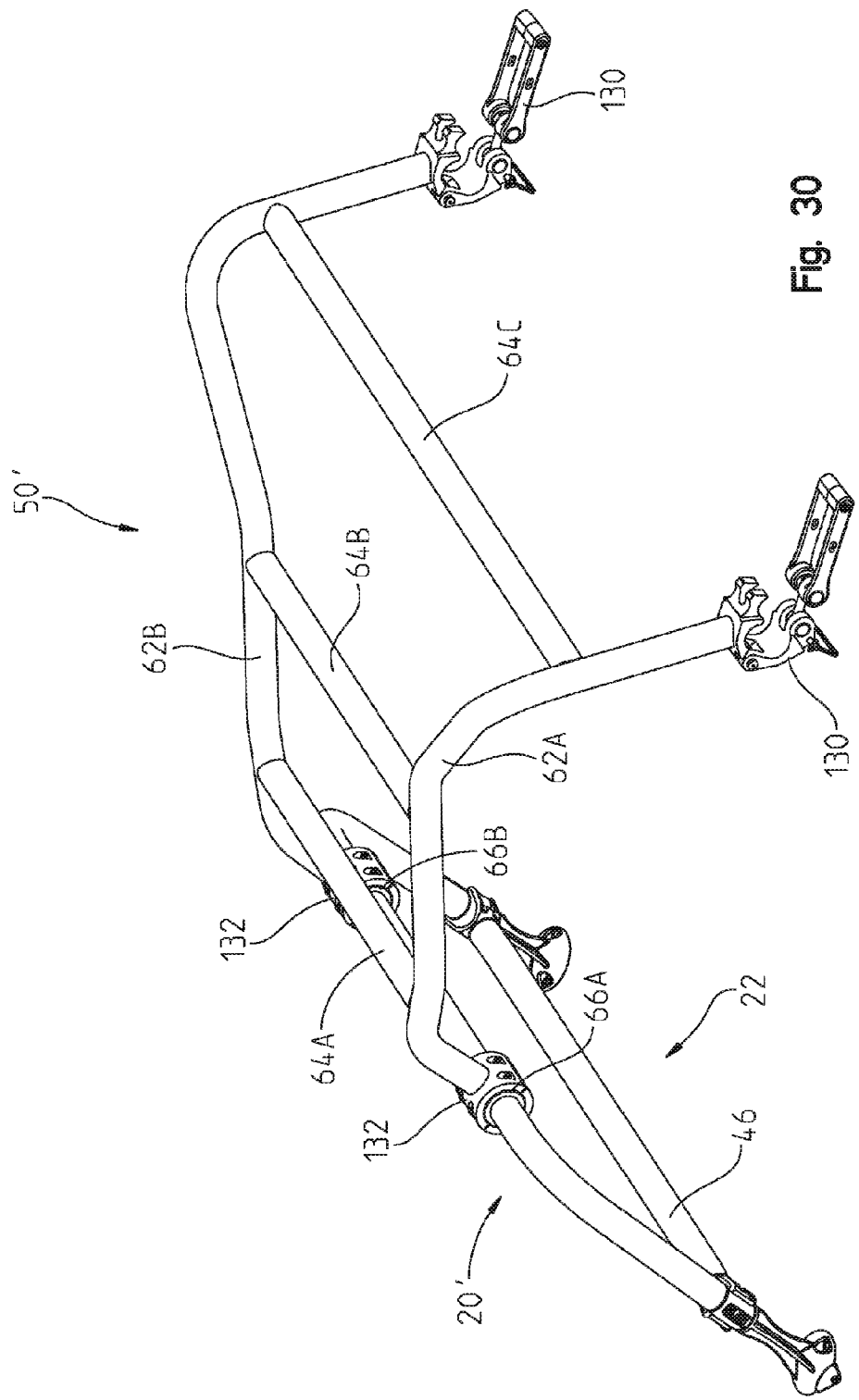
FIG. 30 is a rear perspective view of the roll cage of FIG. 25.
Figure 31:
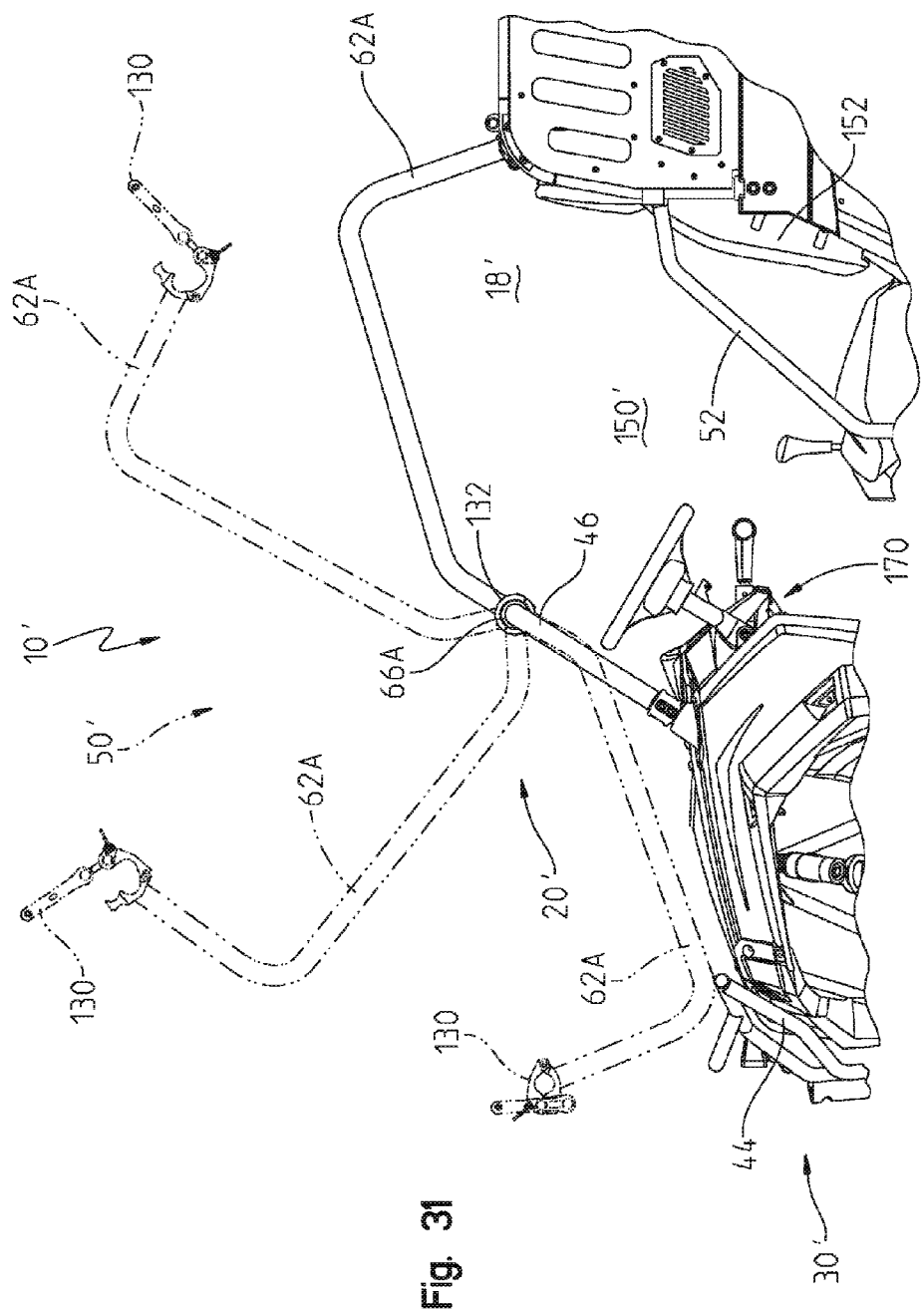
FIG. 31 is a side view of the vehicle of FIG. 25, disclosing illustrative steps of folding the roll cage.
Figure 32:
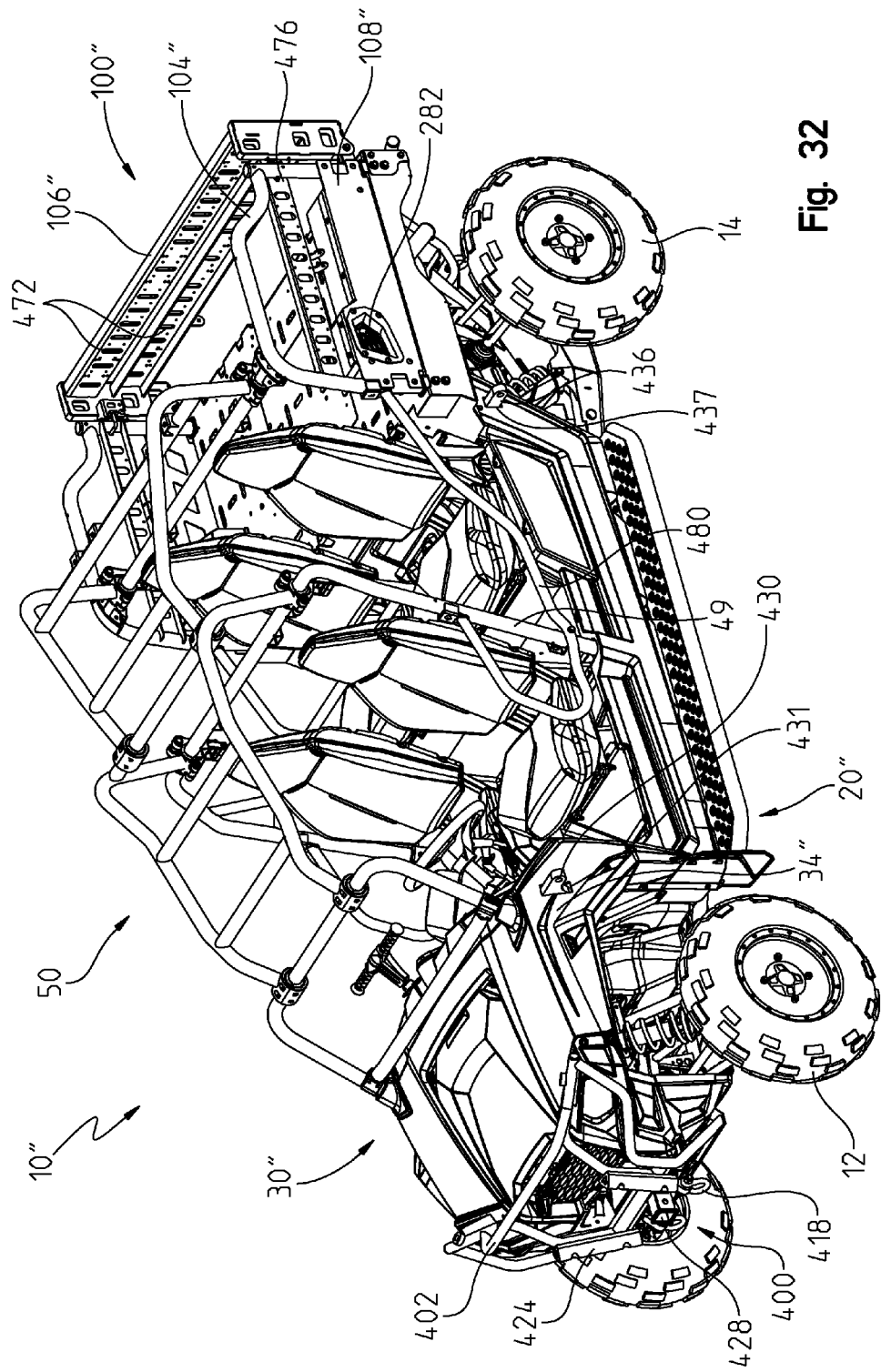
FIG. 32 is a front perspective view of an alternative embodiment vehicle of the present disclosure.

Referring to FIGS. 30 and 31, roll cage 50' may pivot or rotate from a raised position to a lowered position wherein roll cage 50' is secured to hood 32 of vehicle 10'. More particularly, coupling devices 130 and pivot devices 132 cooperate to release roll cage 50' from rear frame member 48.

As shown in FIG. 6D, locking pins 146 may be removed from handles 142 by hand to allow handles 142 to rotate upwardly. As such, handles 142 disengage from cam surfaces 140 and the clamping force is released. Lower clamp portion 136 may rotate away from upper clamp portion 134 when handle 142 is released from cam surfaces 140, which also releases rear frame member 48 from coupling devices 130. In this way, roll cage 50' is freely pivotable about pivot points 66A, 66B, as shown in FIGS. 30 and 31.

When coupling devices 130 are released from rear frame member 48, roll cage 50' is pivoted in a counterclockwise direction about pivot devices 132 coupled to front frame member 46 at pivot points 66A, 66B. In particular, upper and lower pivot members 224, 226 may rotate relative to bushings 222 in order to pivot roll cage 50' toward hood 32. When roll cage 50' is supported in the lowered position, a strap, cable, bungee, or similar flexible component (not shown) may be used to secure roll cage 50' to front brush guard 44, hood 32, or front fenders 34. As such, the height of vehicle 10' is reduced when roll cage 50' is in the lowered position.

As was previously detailed herein, roll cage 50' is pivoted in a forward direction toward hood 32, rather than in a rearward direction toward cargo area 100 or cargo area 500. As such, the cargo area remains open and available for storing and supporting cargo items. Additionally, it may be preferred to remove rear frame member 48 after roll cage 50' is folded forward and stored in the lowered position. Fasteners 110 may be removed from rear frame member 48 and side frames 104 of cargo area 100 in order to remove rear frame member 48 therefrom.

Referring to FIGS. 32-38, an alternative embodiment of vehicle 10 is shown as vehicle 10" and includes features similar to those of vehicle 10 of FIG. 1-24, with like reference numerals indicating like elements having like functionality and structure, except as described below. Vehicle 10" includes a frame assembly 20", a chassis 30", roll cage 50, and a cargo area 100" supported on front wheels 12 and rear wheels 14. Frame 20" supports a front bumper assembly 400, a rear bumper assembly 440, and side carrying members 430, 436.

Figure 34:
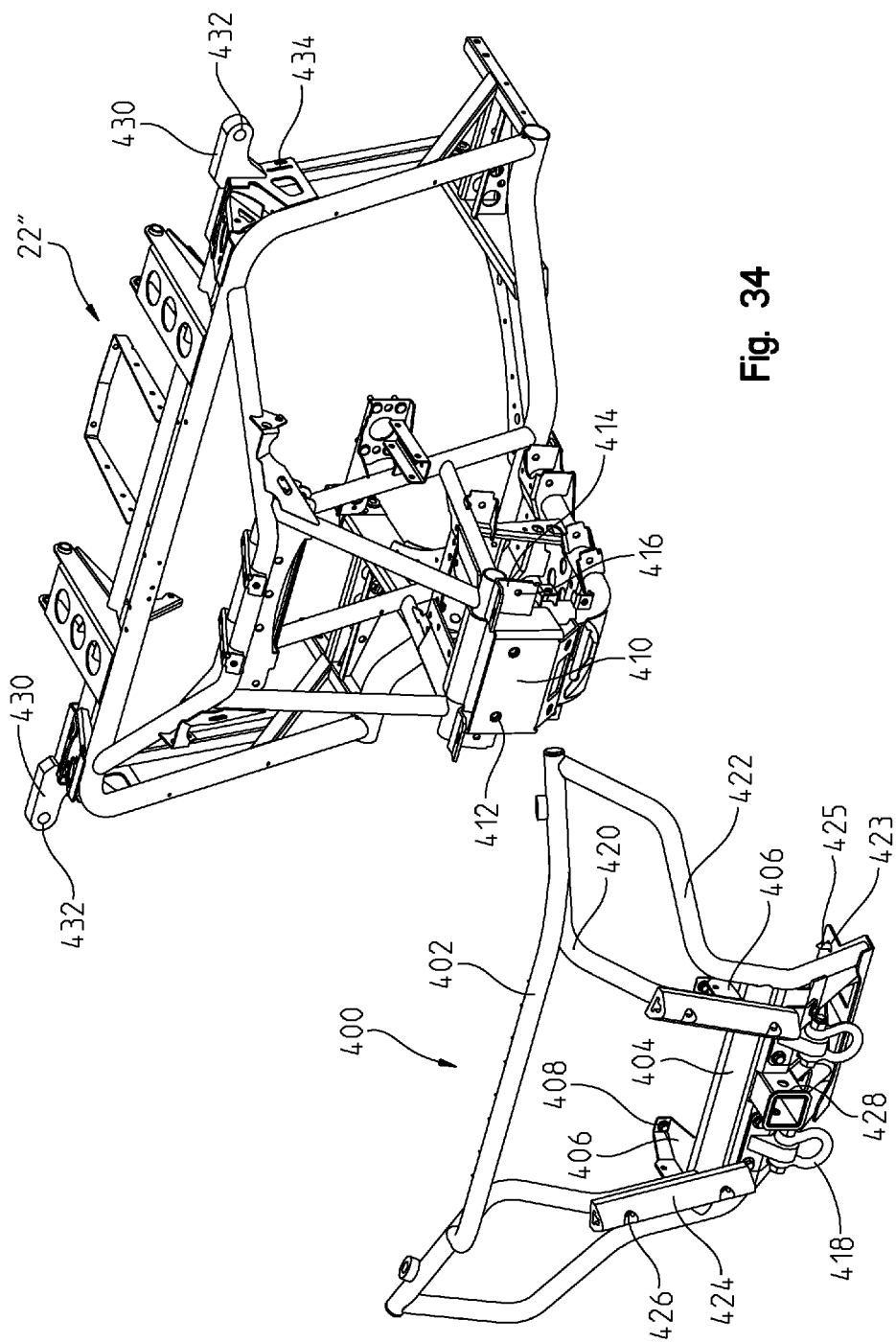
FIG. 34 is an exploded view of a front portion of a frame assembly and a front bumper of the vehicle of FIG. 32.

As shown in FIG. 34, front bumper assembly 400 is coupled to a front frame portion 22' of frame assembly 20" and includes an upper frame member 402, an inner frame member 420, and an outer frame member 422. Frame members 402, 420, and 422 may be integrally formed with each other or may be coupled to each other with conventional fasteners (e.g., bolts, welds, rivets, adhesive). Additionally, by coupling front bumper assembly 400 to front frame portion 22", as detailed herein, front bumper assembly 400 may increase the strength and stability of frame assembly 20". Outer frame members 422 are coupled to each other through a brace member 404. A plurality of brackets 406 may be supported on outer frame members 422 and/or brace member 404 and are coupled to flanges 414 of front frame portion 22". More particularly, fasteners 408 may be received through apertures 416 of flanges 414 in order to couple brackets 406 thereto.

Brace member 404 also may be coupled to a front plate 410 of front frame portion 22". Conventional fasteners may be received through apertures 412 of front plate 410 in order to secure front bumper assembly 400 thereto. Additionally, brace member 404 may be coupled to inner frame members 420. Illustratively, inner frame members 420 support guard members 424. Guard members 424 may be coupled to inner frame members 420 with fasteners 426. Inner frame members 420 also are attached to a bracket 423, which couples with front frame portion 22" through fasteners 425.

As shown in FIG. 34, front bumper assembly 400 also may include accessories. For example, front bumper assembly 400 may include a towing member, illustratively a receiver hitch 428, and latches 418 supported below brace member 404. In one embodiment, latches 418 are fixed to vehicle 10" and are used as tie-down members for coupling vehicle 10" during transport. For example, latches 418 may secure vehicle 10" to an aircraft during transport. Receiver hitch 428 may be configured for towing and/or for use with a multi-mount winch assembly.

Front frame portion 22" also supports side carrying members 430. Illustratively, vehicle 10" includes two opposing side carrying members 430 positioned rearward of front bumper assembly 400. Side carrying members 430 are coupled to a bracket 434 of front frame portion 22" and extend laterally outward therefrom and through an opening 431 in a front fender 34" of chassis 30". Side carrying member 430 includes an aperture 432 for coupling to various cargo and/or transportation means. In one embodiment, exemplary apertures 432 are configured to receive cables, hooks, latches, ropes, wire, or other similar objects in order to couple vehicle 10" to a parachute, helicopter, aircraft carrier, or other transportation means for transporting vehicle 10". Other configurations of side carrying members 430 may be used.

Figure 33:
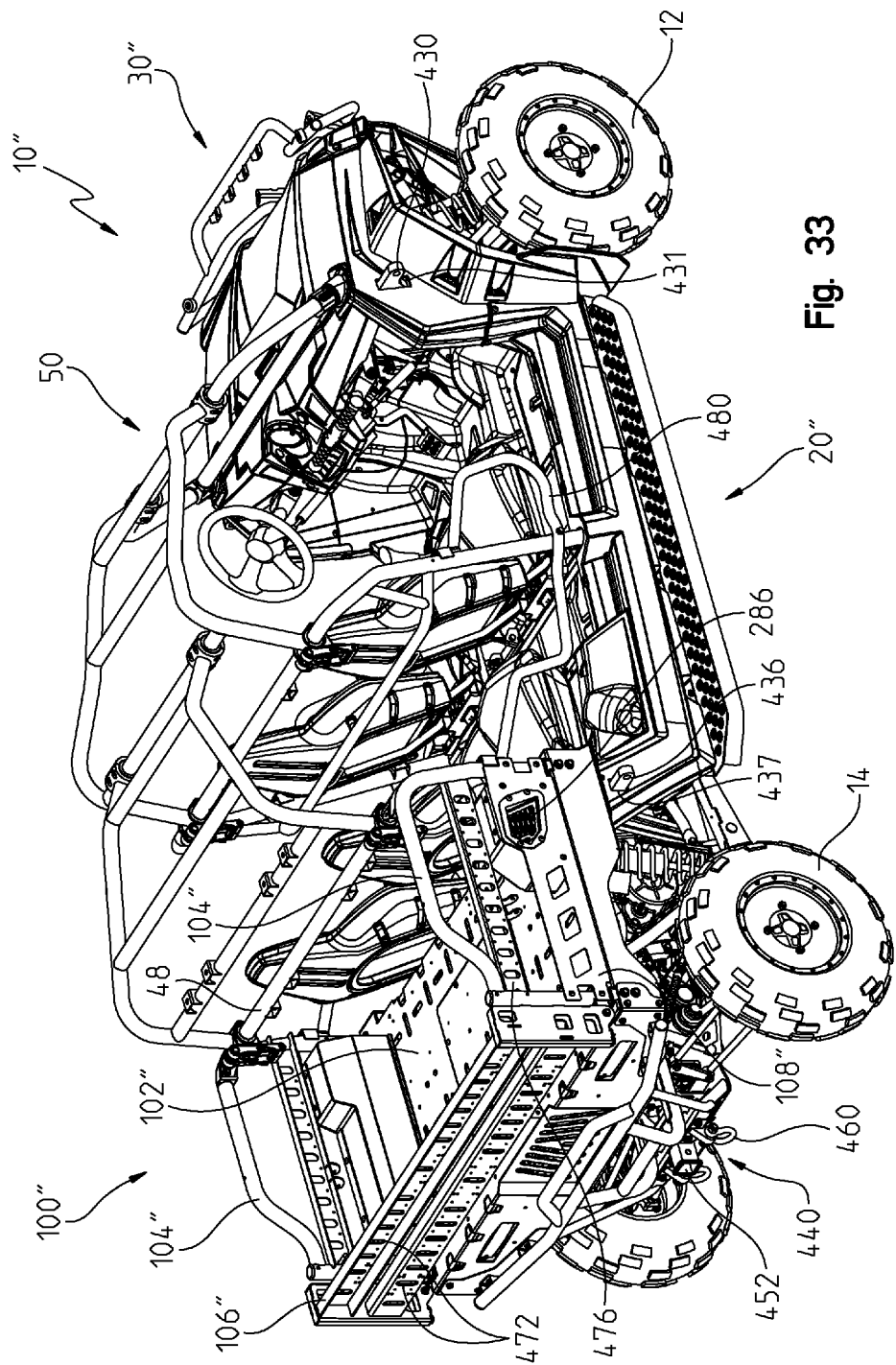
FIG. 33 is a rear perspective view of the vehicle of FIG. 32.
Figure 35:
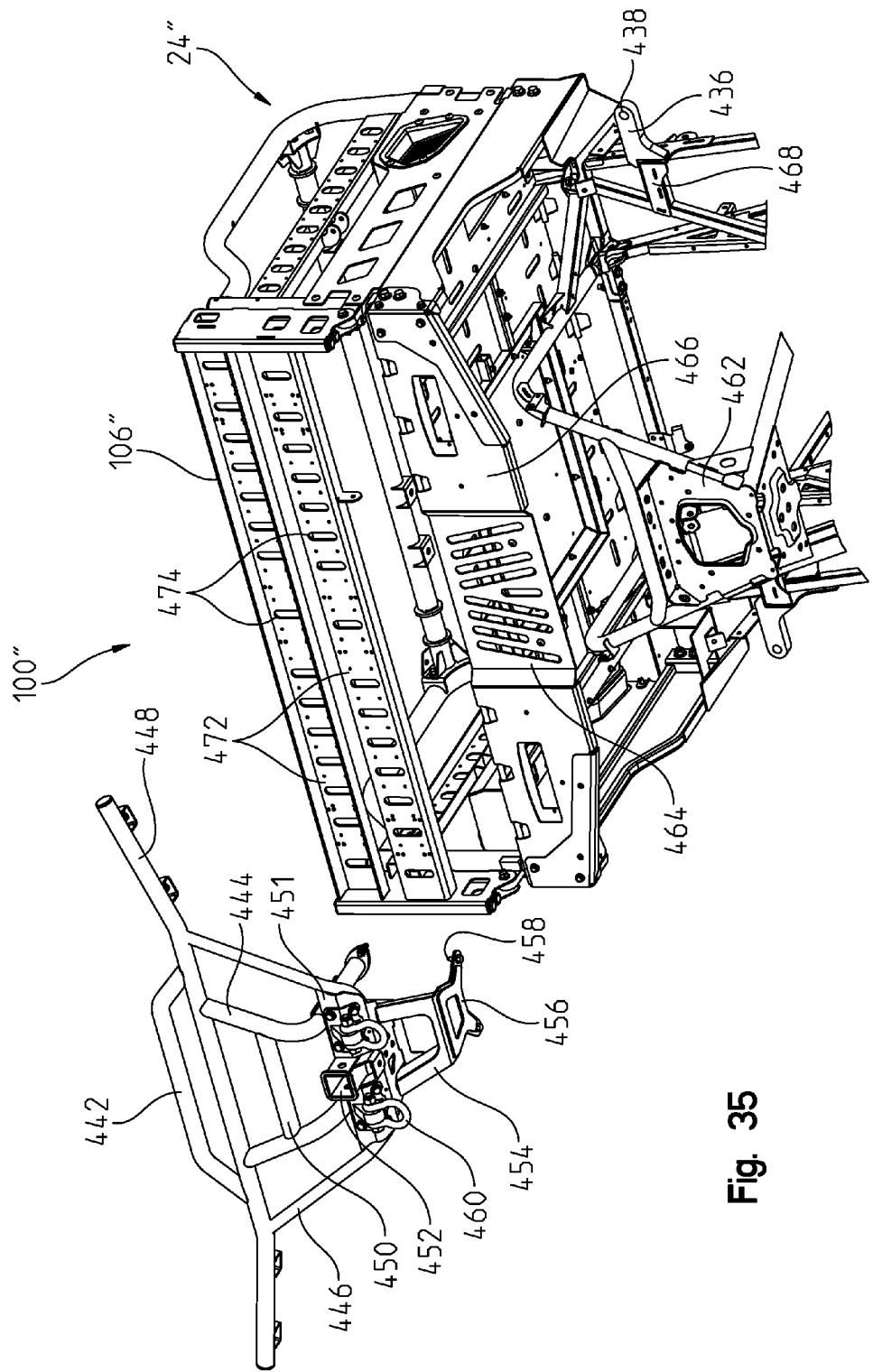
FIG. 35 is an exploded view of a rear portion of the frame assembly and a rear bumper of the vehicle of FIG. 33.

Similarly, as shown in FIGS. 33 and 35, a rear frame portion 24" of frame assembly 20" supports additional side carrying members 436. Illustratively, vehicle 10" includes two opposing side carrying members 436 positioned forwardly of rear bumper assembly 440. Side carrying members 436 are coupled to a bracket 468 of rear frame portion 24" and extend laterally outward therefrom and through an opening 437 in a rear portion of a side board 38" of chassis 30". Side carrying member 436 includes an aperture 438 for coupling to various cargo and/or transportation means. In one embodiment, exemplary apertures 438 are configured to receive cables, hooks, latches, ropes, wire, or other similar objects in order to couple vehicle 10" to a parachute, helicopter, aircraft carrier, or other transportation means for transporting vehicle 10". Other configurations of side carrying members 436 may be used.

Rear frame portion 24" also supports rear bumper assembly 440, as shown in FIG. 35. Rear bumper assembly 440 includes an upper frame member 442, a laterally-extending frame member 448, lower inner frame members 444, and lower outer frame members 446. Frame members 442, 444, 446, and 448 of rear bumper assembly 440 may be integrally formed together or may be coupled together with conventional fasteners (e.g., welds, bolts, rivets, and/or adhesive). Additionally, by coupling rear bumper assembly 440 to rear frame portion 24", as detailed herein, rear bumper assembly 440 may increase the strength and stability of frame assembly 20". Lower inner and outer frame members 444, 446 extend between laterally-extending frame member 448 and a brace 451. Additionally, a brace 450 may extend between lower inner frame members 444. A bracket having a rear plate 454 and a lower plate 456 may be used to couple rear bumper assembly 440 to rear frame portion 24". More particularly, fasteners 458 may be used to couple rear bumper assembly 440 to a rear support member 462 of rear frame portion 24". As such, rear bumper assembly 440 is generally supported below a rear center panel 464 and rear outer panels 466 of chassis 30".

Figure 36:
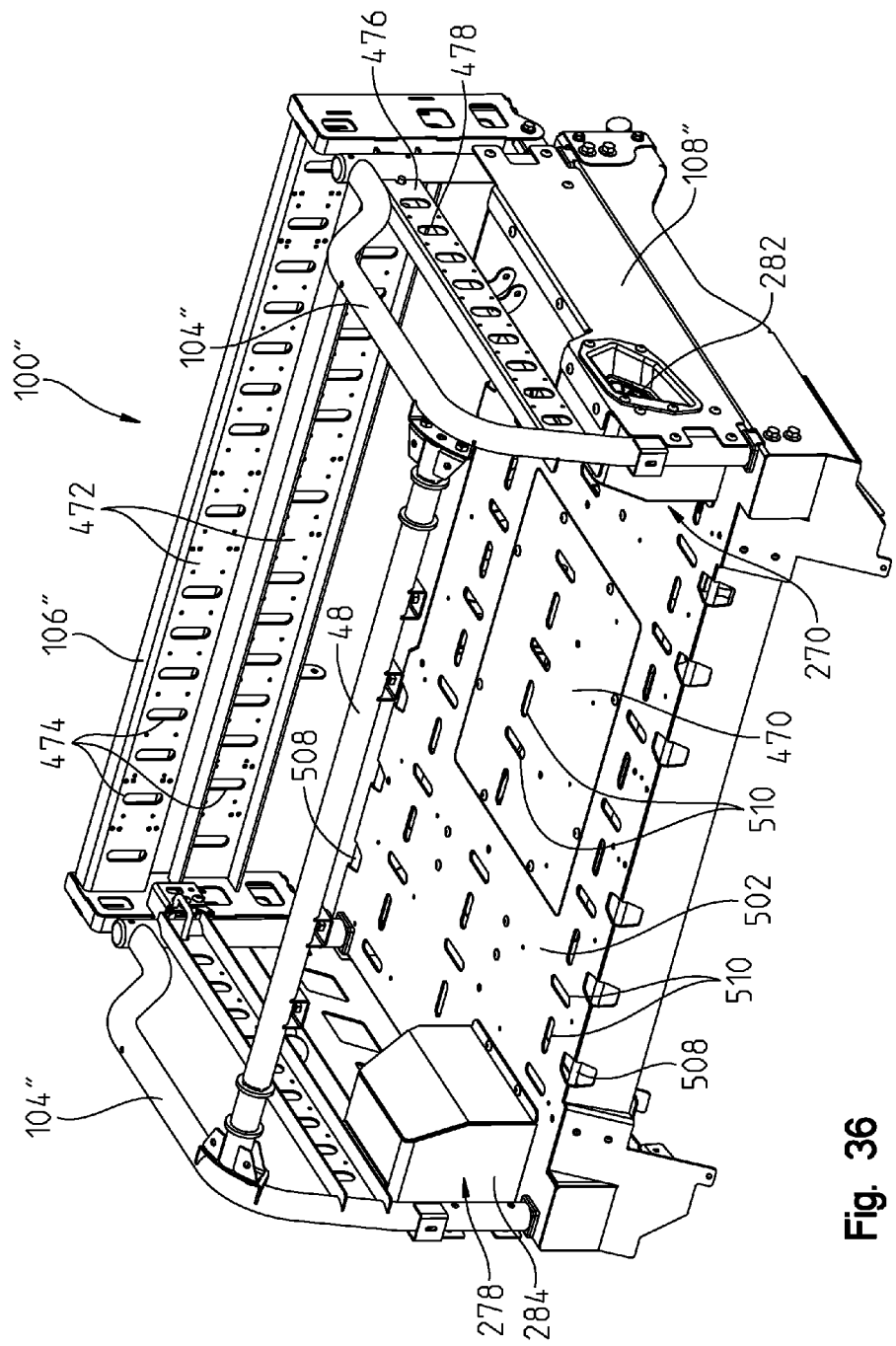
FIG. 36 is a front perspective view of a cargo area of the vehicle of FIG. 32.

As shown in FIG. 36, rear bumper assembly 440 also may include accessories. For example, rear bumper assembly 440 may include a towing member, illustratively a receiver hitch 452, and latches 460 supported on brace 451. In one embodiment, latches 460 are fixed to vehicle 10" and used as tie-down members for coupling vehicle 10" during transport. Receiver hitch 452 may be configured for towing and/or for use with a multi-mount winch assembly.

Figure 37:
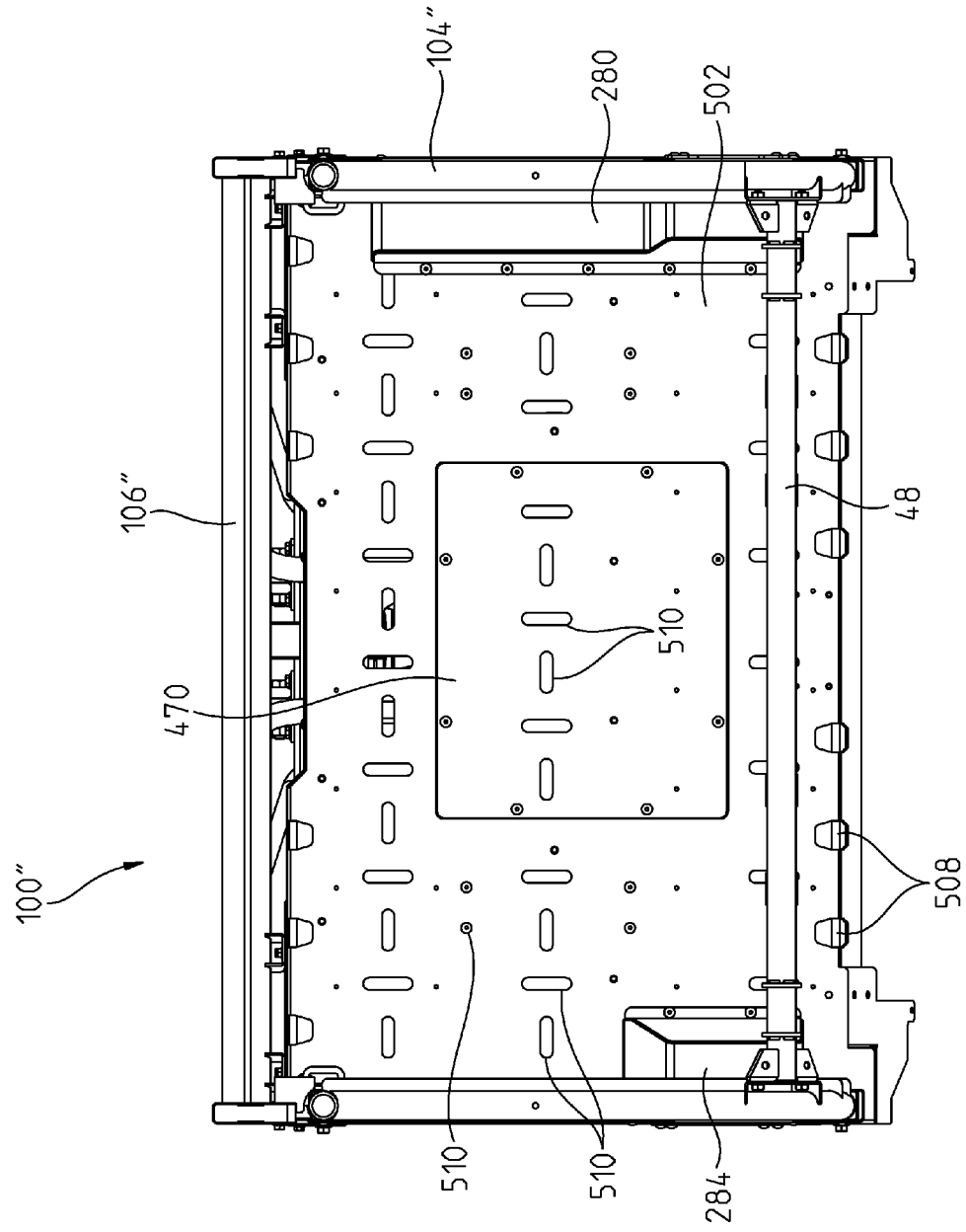
FIG. 37 is a top view of the cargo area of FIG. 36.

Referring now to FIGS. 35-37, rear frame portion 24" also supports cargo area 100". Cargo area 100" is generally identical to cargo area 100 of FIGS. 1-3 and cargo area 500 of FIGS. 22A and 22B, wherein like reference numbers indicate like components, except as described below. Cargo area 100" includes support plate 502, side frames 104", side walls 108", and a rear frame 106". Cargo area 100" also includes a plurality of coupling locations, illustratively tie-down rods 508 and apertures 510, on support plate 502. Apertures 510 may be configured to receive conventional fasteners, such as bolts, hooks, and latches, in order to retain cargo within cargo area 500. Furthermore, apertures 510 may be used to secure rails 114 (FIG. 21) to support plate 502, as detailed herein, to allow an operator to position rails 114 in any desired location on support plate 502. In one embodiment, support plate 502 includes a removable cover 470 that also includes apertures 510. Removable cover 470 conceals drivetrain assembly 16 and may be removed in order to allow access thereto.

In one embodiment, rear frame 106" of cargo area 100" is a movable tailgate configured to pivot between a closed, or latched, position and an open, or unlatched, position. As shown in FIG. 36, rear frame 106" includes cross members 472, which are generally parallel to each other. Cross members 472 include a plurality of apertures 474, thereby allowing additional components, accessories, cargo, and/or transportation means to be coupled to vehicle 10". Additionally, apertures 474 reduce the weight of rear frame 106" and, therefore, vehicle 10".

Side walls 108" are positioned generally forward of rear frame 106" and are coupled to side frames 104" and a brace 476. Brace 476 is spaced apart from side walls 108" and side frames 104" and includes apertures 478. Brace 476 may be welded to side frames 104". Apertures 478 allow additional components, accessories, cargo, and/or transportation means to be coupled to vehicle 10". More particularly, an accessory, cargo, and/or a transportation tie-down member may be coupled to side frames 104" and further secured to brace 476 with a latch, hook, wire, rope, cable, or other fastener. Additionally, apertures 478 reduce the weight of cargo area 100" and, therefore, vehicle 10".

Figure 38:
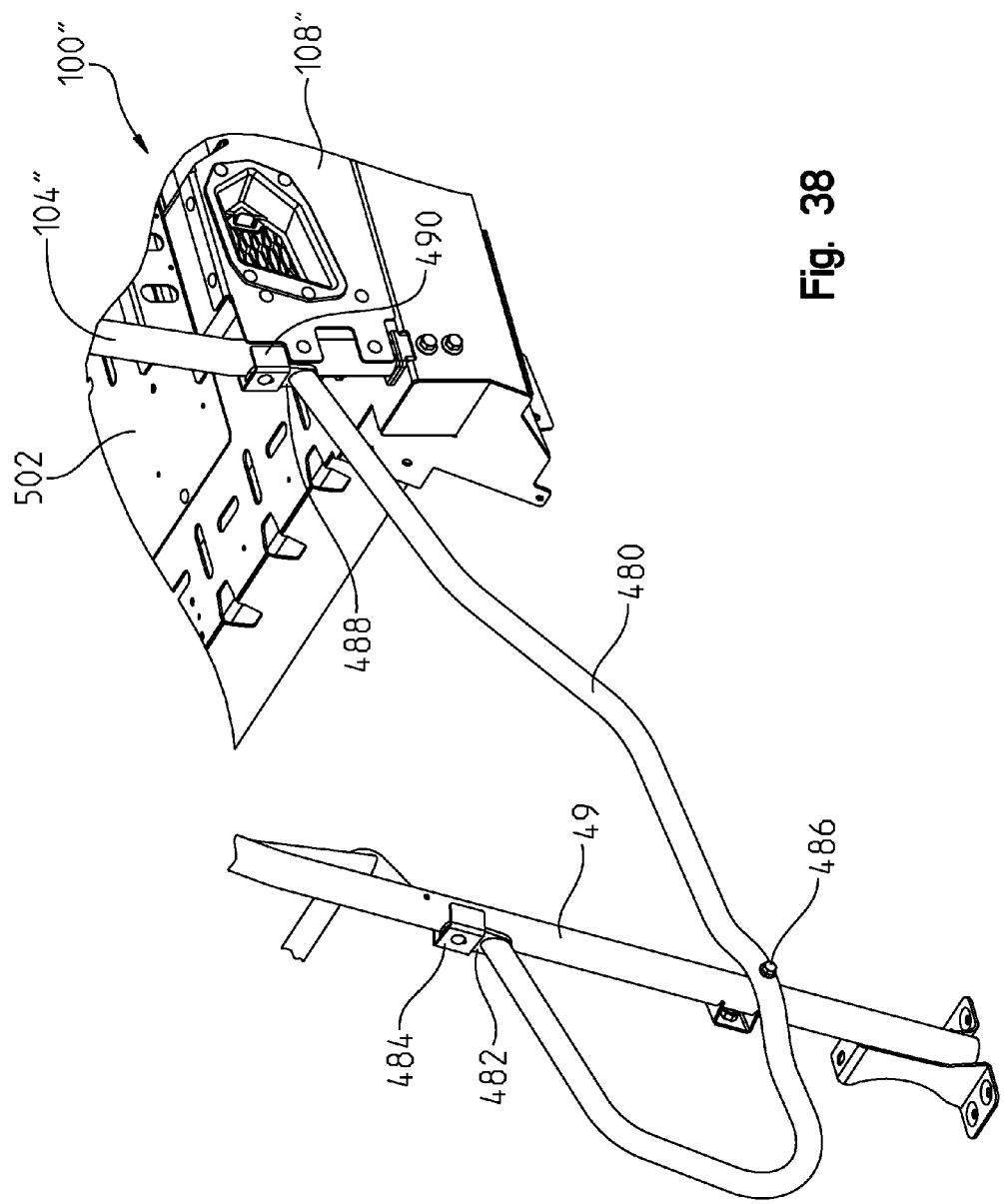
FIG. 38 is a front perspective view of a bolster bar of the vehicle of FIG. 32.

Side frames 104" also may be coupled to a bolster bar 480, as shown in FIG. 38. Bolster bar 480 extends from cargo area 100" to front frame portion 22" in order to further support passengers and the operator within vehicle 10". Illustrative bolster bar 480 is a single component that is coupled to side frames 104" through a bracket 490 on side frames 104" and a tab 488 on bolster bar 480. Bolster bar 480 also is coupled to intermediate frame member 49 with a fastener 486 and may be further secured thereto through a bracket 484 on intermediate frame member 49 and a tab 482 on bolster bar 480.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle comprising:
a plurality of ground engaging members;
a frame supported by the plurality of ground engaging members;
a hood supported by the frame;
an engine supported by the frame and configured to provide power to at least one of the plurality of ground engaging members;
a seating area supported by the ground engaging members;
a cargo area rearward of the seating area;
a roll cage positionable above the seating area, the roll cage being configured to rotate between a first position and a second position, the first position including the roll cage being positioned above the seating area, and the second position including the roll cage pivoted in a forward direction and supported on the hood, the roll cage being spaced apart from the cargo area when in the second position; and
at least one coupling device configured to rotate between an open position and a closed position to receive a portion of the roll cage, and, when in the closed position, the coupling device defines an aperture having a shape complementary to that of the portion of the roll cage.

2. The vehicle of claim 1, wherein the roll cage includes a first section and second section, the second section being coupled to the first section.

3. The vehicle of claim 2, wherein the second section is configured to move with the first section in the forward direction.

4. The vehicle of claim 1, wherein the cargo area includes a rear member having vertical attachment members positioned between horizontally extending frame members.

5. The vehicle of claim 1, further comprising an air intake system operably coupled to the engine, the air intake system being supported by the cargo area.

\* \* \* \* \*